US007329294B2

(12) United States Patent
Conrad

(10) Patent No.: US 7,329,294 B2
(45) Date of Patent: Feb. 12, 2008

(54) DIRT CONTAINER FOR A SURFACE CLEANING APPARATUS AND METHOD OF USE

(75) Inventor: Wayne Ernest Conrad, Hampton (CA)

(73) Assignee: Polar Light Limited, Tai Po, N.T. (HK)

( * ) Notice: Subject to any disclaimer, the term of this patent is extended or adjusted under 35 U.S.C. 154(b) by 395 days.

(21) Appl. No.: 10/971,764

(22) Filed: Oct. 25, 2004

(65) Prior Publication Data

US 2005/0115409 A1 Jun. 2, 2005

Related U.S. Application Data

(60) Provisional application No. 60/513,226, filed on Oct. 23, 2003.

(51) Int. Cl.
*B01D 45/12* (2006.01)

(52) U.S. Cl. ............................ 55/319; 55/337; 55/418; 55/429; 55/459.1; 55/DIG. 3; 15/350; 15/353

(58) Field of Classification Search .................. 55/319, 55/337, 418, 429, 459.1, DIG. 3, 467; 15/350, 15/353
See application file for complete search history.

(56) References Cited

U.S. PATENT DOCUMENTS 2,227,104 A * 12/1940 Parker ........................ 15/41.1
2,564,339 A 8/1951 Nerhim
3,440,805 A 4/1969 Cordell
4,539,027 A 9/1985 Förnäs et al.
5,018,240 A 5/1991 Holman et al.
5,090,976 A 2/1992 Dyson
5,092,913 A 3/1992 Yen
5,095,579 A 3/1992 Becker et al.
5,145,499 A 9/1992 Dyson
6,178,590 B1 1/2001 Lindsay, III et al.
2002/0043055 A1 4/2002 Conrad
2003/0182756 A1 10/2003 Duggan
2004/0031111 A1* 2/2004 Porchia et al. ............... 15/52.1

FOREIGN PATENT DOCUMENTS

DE 91 14 068 2/1992
DE 44 42 422 A1 5/1996
DE 201 09 699 U1 10/2001
EP 081102 A1 * 8/1995
EP 1 179 312 2/2002
EP 1 219 222 7/2002
EP 1 252 853 10/2002
GB 720 135 12/1954

* cited by examiner

*Primary Examiner*—Robert A. Hopkins
(74) *Attorney, Agent, or Firm*—Philip Mendes da Costa; Bereskin & Parr

(57) ABSTRACT

A dirt container for a surface cleaning apparatus is constructed from an air impermeable material and exterior walls of sufficient rigidity to maintain the shape of the dirt container. The dirt container may be supplied in a disassembled condition and assembled by a consumer prior to use.

57 Claims, 22 Drawing Sheets

DIRT CONTAINER FOR A SURFACE CLEANING APPARATUS AND METHOD OF USE

FIELD OF THE INVENTION

This application relates to dirt bin or dirt container for an apparatus for cleaning a surface, such as a vacuum cleaner, carpet extractor, sweeper or the like, and a method for the use of the dirt container. In one aspect of the invention, the dirt container is disposable and is constructed from an air impermeable material.

BACKGROUND OF THE INVENTION

Various different formats of vacuum cleaners are known in the art. These include upright vacuum cleaners, canister vacuum cleaners, stick vacuum cleaners and central vacuum systems. Typically, a vacuum cleaner uses a combination of mechanical action (e.g. a rotating brush) and suction to entrain material in a dirty air stream that enters the vacuum cleaner. The dirty air stream is treated in one or more steps as the dirty air passes through the vacuum cleaner. Typically, vacuum cleaners use cyclonic separation and/or physical filter members (e.g. filters) to remove entrained material from a dirty air stream that enters the vacuum cleaner.

An advantage of cyclone separators when used to remove entrained material from a dirty air stream that enters a vacuum cleaner is that the vacuum cleaner has a generally constant level of performance as the cyclone separator collects dirt and other entrained material. Prior to the use of cyclone separators, vacuum cleaners typically used filter bags to clean a dirty air stream. The filter bag had a dirty air inlet. The motor and fan assembly of the vacuum cleaner caused the dirty air stream to pass through the dirty air inlet of the filter bag and to then pass out of the air permeable walls of the filter bag thereby filtering the air. As the filter bag was used, the pores in the walls of the filter bag became blocked thereby reducing the airflow through the vacuum cleaner and reducing the cleaning efficiency of the vacuum cleaner.

An advantage of filter bags is that the bag does not have to be emptied by a user. Instead, the bag is thrown away and a new bag installed. However, when a used filter bag is removed from a vacuum cleaner and moved to a garbage can of the like, dirt escapes from the bag. While cyclone separators enable the construction of vacuum cleaners that have constant cleaning performance, a cyclone separator must be emptied by a consumer when the cyclone separator is full.

In the past, it has been taught to use a liner in a cyclone separator of a vacuum cleaner to simplify the emptying of the cyclone separator. See U.S. Pat. No. 5,090,976 (Dyson). However, the use of the liner still requires the user to open the cyclone separator and manipulate the liner for disposal, thus resulting in the release of collected dirt into the air.

SUMMARY OF THE INVENTION

In accordance with one aspect of the instant invention, a disposable dirt container is constructed from a material that is air impermeable (e.g., plastic) and has walls that are sufficiently thick so as to define the shape of the dirt container. Preferably, the dirt container includes at least one cyclone separator and, accordingly, the dirt container has at least one dirty air inlet and at least one cleaned air outlet. Unlike the use of a disposable liner for a cyclone separator that requires a user to open the cyclone separator to remove the liner, the disposable dirt container may simply be removed from a surface cleaning apparatus and thrown away. A clean, empty dirt container may then be inserted in the surface cleaning apparatus and the surface cleaning apparatus is then ready for further use.

Accordingly, an advantage of this embodiment is that a consumer may empty a vacuum cleaner by removing the dirt container from the vacuum cleaner and placing the used dirt container in a garbage can. As the dirt container has a defined shape and is made from an air impermeable material, dirt will essentially not escape from the dirt container as the dirt container is moved by a consumer. Optionally, a closure member may be provided to close one or more of the inlets and outlets from the dirt container (e.g., a settling chamber inlet, a cyclone inlet, a cyclone outlet or other inlets and outlets that may be required due to the dirt removal member or members provided in the dirt container).

In accordance with another aspect of the instant invention, there is provided a disposable cyclonic dirt container comprising a chamber configured to permit some particulate material to settle out from an air stream as that air stream passes thought the chamber and at least one cyclone. The cyclone may be positioned downstream from the chamber. Alternately, each of the chamber and the cyclone may have an inlet that is in communication with the surface engaging portion of a surface cleaning head. The use of a gravity-settling chamber permits some of the larger particulate matter (e.g., particulate matter having a size from about 3 to about 20 mm in diameter or larger) to be collected. Thus, the cyclone may be designed to collect finer particulate matter (e.g., particulate matter having a size from less than about 3 mm in diameter). In a typical household, only a portion of the particulate matter that is picked up by a vacuum cleaner is finer particulate matter. Thus the cyclone separator may have a substantially reduced collected dirt storage capacity and, further, the volume of the cyclone separator may be reduced.

In accordance with another aspect of the instant invention, there is provided a dirt container comprising two or more portions that are configurable between a disassembled configuration and an assembled configuration. For example, the two or more portions may be pivotally connected together for movement between the disassembled configuration and the assembled configuration. Alternately, the two or more portions may be physically separate elements that need to be joined together to define the dirt container. Preferably, the disposable dirt container is configured to be nestable in another disposable dirt container. An advantage of this design is that the volume of a plurality of clean dirt containers may be reduced by at least partially nesting the dirt containers in each other. This enables consumers and retailers to store more dirt containers in any given space.

In accordance with one aspect of the present invention, there is provided a surface cleaning apparatus comprising:

(a) a housing; and, (b) a disposable dirt container constructed from an air impermeable material, the dirt container being removably receivable in the housing.

As opposed to a paper dust bag which is known in the art, the dirt container is constructed from a material which has pore sizes sufficiently small so as to prevent air from passing through the exterior walls of the dirt container. Accordingly, an advantage of this aspect of the invention is that dirt will not be expelled from the dirt container when the dirt container is handled by a user. Preferably, the air impermeable material is plastic and, more preferably, the dirt container is prepared by molding, extruding or vacuum forming.

In one embodiment, the surface cleaning apparatus may be a vacuum cleaner or carpet extractor. Accordingly, the surface cleaning apparatus further comprises an airflow path extending from a dirty air inlet to a clean air outlet and a motor and fan blade assembly, the fan blade positioned in the air flow path, the dirt container having an air inlet and an air outlet and being positioned in the air flow path.

In another embodiment, the dirt container has rigid exterior walls, namely that the walls have a thickness that is sufficient to permit the walls to essentially maintain the shape of the dirt container without external support. The wall may have a thickness up to 1 mm and, preferably, from 0.3 to 1 mm. It will be appreciated that, with a wall thickness of about 0.3, the dirt container could easily be deformed by a consumer if the consumer presses with a lot of force on the exterior walls of the dirt container. The walls may be reinforced, such as by providing ribs.

In another embodiment, the dirt container includes at least one cyclone.

In another embodiment, the dirt container includes a gravity settling chamber and at least one cyclone. A gravity settling chamber may be any chamber in which some particulate matter may settle out of the air due to gravity. Accordingly, the gravity settling chamber may have a lower portion in which the velocity of the air is reduced so as to permit particulate matter to be disentrained and, more preferably, the air is essentially stagnant. In one particularly preferred embodiment, there is essentially no airflow through the gravity settling chamber, i.e. the gravity settling chamber is not in communication with a source of suction and the only air flow is induced by the sweeping action of a brushing member that conveys particulate matter into the gravity settling chamber.

In another embodiment, the cyclone may be downstream from the gravity-settling chamber or the cyclone and the gravity-settling chamber may each have a separate air inlet. Optionally, the dirt container further includes a screen positioned upstream of the cyclone, the screen having openings therethrough sized to retain a portion of the particulate matter in the gravity settling chamber.

In another embodiment, the surface cleaning apparatus further comprises a cleaning head having a brush, and the dirt container includes a chamber positioned to receive particulate matter swept up by the brush. Optionally, the dirt container further includes a cyclone. The cyclone may be downstream from the gravity-settling chamber or the cyclone and the gravity-settling chamber may each have a separate air inlet. Optionally, the dirt container further includes a screen positioned upstream of the cyclone, the screen having openings therethrough sized to retain a portion of the particulate matter in the gravity settling chamber. In such embodiments, the gravity settling chamber functions to remove larger particulate matter from the air stream resulting in only finer particulate matter passing into the cyclone. An advantage of such a design is that the cyclone may be designed to be efficient at removing only finer particulate matter.

In another embodiment, the dirt container has an inlet and a closure member movable between an open position in which the inlet is open and a closed position in which the inlet is closed. An advantage of such a design is that, by closing one or more of the inlets and outlets of the dirt container, the amount of particulate matter that may be expelled from the dirt container as the dirt container is handled by a user is reduced. This is particularly advantageous if the dirt container has a wall thickness of about 0.3 mm since a consumer could more readily apply too much pressure and deform the dirt container causing particulate matter to be expelled therefrom.

The surface cleaning apparatus may further include an actuator drivingly connectable to the closure member. The actuator may be mounted on the housing. The actuator may include a cam. An advantage of such an embodiment is that the closure member may be automatically closed as the container is removed from the surface cleaning apparatus.

In another embodiment, the housing has a recess and an access panel which is moveably mounted between a closed position in which the recess is closed and an open position, and the dirt container is removably receivable in the recess. The dirt container may be removably mounted to the access panel. Alternately, or in addition, the access panel may be detachable from the housing or it may be pivotally mounted thereto.

In another embodiment, the dirt container is configurable between an assembled configuration and a disassembled configuration. Preferably, when in the disassembled configuration, the dirt container is at least partially nestable in another dirt container.

In accordance with another aspect of the instant invention, there is provided a dirt container for a surface cleaning apparatus wherein the dirt container is configurable between an assembled configuration and a disassembled configuration, and, in the disassembled configuration, the dirt container is at least partially nestable in another dirt container.

In one embodiment, the dirt container is disposable.

In another embodiment, the dirt container has an inlet and a closure member movable between an open position in which the inlet is open and a closed position in which the inlet is closed.

In another embodiment, the dirt container has at least first and second portions which when assembled together result in the dirt container being in the assembled configuration.

In another embodiment, at least one of the first and second portions is moveable mounted to another of the portions.

In another embodiment, the dirt container further comprises a securing member to maintain the portions in the closed configuration. The securing member may comprise male and female engagement members and/or an adhesive. For example, one of the first and second portions may have male engagement members and another of the portions may have female engagement members.

In accordance with another aspect of the present invention, there is provided a method of operating a surface cleaning apparatus comprising:

(a) passing a surface cleaning head over a surface and collecting particulate matter in a dirt container constructed from an air impermeable material;
(b) removing the dirt container from the surface cleaning apparatus; and,
(c) disposing of the dirt container.

In one embodiment, the method further comprises inserting a clean dirt container constructed from an air impermeable material in the surface cleaning apparatus.

In another embodiment, the method further comprises assembling the clean dirt container prior to inserting the clean dirt container in the surface cleaning apparatus.

In another embodiment, the dirt container has an inlet and an associated closure member movable between an open position and a closed position and the method further comprises moving the closure member to the closed position as the dirt container is withdrawn from the surface cleaning apparatus.

In another embodiment, the dirt container has an inlet and an associated closure member movable between an open position and a closed position and the method further comprises moving the closure member to the closed position after the dirt container has been withdrawn from the surface cleaning apparatus.

In another embodiment, the clean dirt container has an inlet and an associated closure member movable between an open position and a closed position and the method further comprises moving the closure member to the open position as the clean dirt container is inserted into the surface cleaning apparatus.

In another embodiment, the clean dirt container has an inlet and an associated closure member movable between an open position and a closed position and the method further comprises moving the closure member to the open position after the clean dirt container has been inserted into the surface cleaning apparatus.

In accordance with another aspect of the present invention, there is also provided a method of preparing a surface cleaning apparatus for use in cleaning a surface comprising:

(a) providing at least one disposable dirt container in a disassembled configuration;

(b) assembling the disposable dirt container; and, (c) inserting the disposable dirt container in the surface cleaning apparatus.

In one embodiment, the dirt container comprises at least two portions that are configurable between a disassembled configuration and an assembled configuration and step (b) comprises placing the portions in the assembled configuration.

In another embodiment, the dirt container includes a securing member and the method further comprises using the securing member to retain the portions in the assembled configuration.

In another embodiment, the securing member comprises male and female engagement members and the method further comprises interengaging the male and female engagement members.

In another embodiment, the securing member comprises an adhesive and the method further comprises using the adhesive to secure the portions in the assembled configuration.

In another embodiment, the dirt container, when in the disassembled configuration, is nested in another dirt container that is also in the disassembled configuration and step (a) further comprises removing the dirt container from the other dirt container.

In accordance with another aspect of the present invention, there is also provided a method of preparing a surface cleaning apparatus for use in cleaning a surface comprising:

(a) providing a plurality of dirt containers in a nested, disassembled configuration;

(b) removing a dirt container from the other dirt containers;

(c) assembling the dirt container; and, (d) inserting the dirt container in the surface cleaning apparatus.

In one embodiment, the dirt container comprises at least two portions that are configurable between a disassembled configuration and an assembled configuration and step (c) comprises placing the portions in the assembled configuration.

In another embodiment, the dirt container includes a securing member and the method further comprises using the securing member to retain the portions in the assembled configuration.

In another embodiment, the securing member comprises male and female engagement members and the method further comprises interengaging the male and female engagement members.

In another embodiment, the securing member comprises an adhesive and the method further comprises using the adhesive to retain the portions in the assembled configuration.

BRIEF DESCRIPTION OF THE DRAWINGS

These and other advantages of the instant invention will be more fully and completely understood in accordance with the following description of the preferred embodiments of the vacuum cleaner in which.

DESCRIPTION OF THE PREFERRED EMBODIMENTS

The dirt container of the instant invention may be used with an upright vacuum cleaner, a canister vacuum cleaner, a stick vacuum cleaner, a central vacuum cleaner, a sweeper, a carpet extractor or other surface cleaning apparatus of any configuration. For example, in FIGS. 1-15, a dirt container is exemplified as it may be used with a vacuum cleaner having a motor affixed to the handle of the vacuum cleaner. In FIGS. 16, 17A, 17B, 19, 19A, 19B and 20, an alternate dirt container is exemplified in a vacuum cleaner having all of the working components in the surface cleaning head. In FIG. 18, a surface cleaning apparatus incorporating two alternate dirt containers is exemplified. The following description of these preferred embodiments exemplify that the dirt container may be of various sizes and shapes and may include a variety of air cleaning members.

Figure 1:
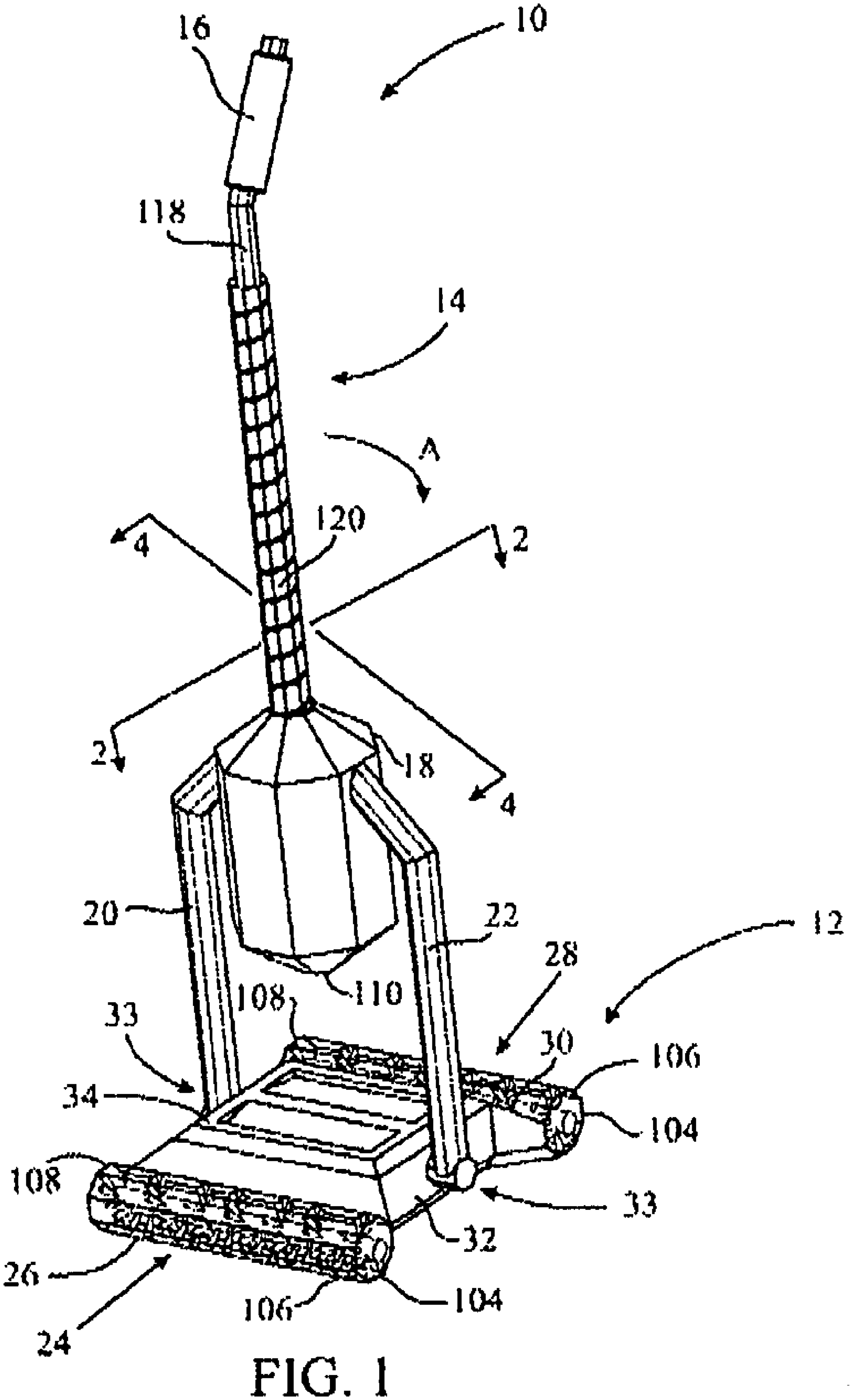
FIG. 1 is a perspective view of a vacuum cleaner using a dirt container according to the instant invention.

As shown in FIG. 1, vacuum cleaner 10 may comprise surface cleaning head 12 and motor and handle assembly 14. Motor and handle assembly 14 comprises handle 16 and motor housing 18. Motor and handle assembly 14 may be drivingly connected to surface cleaning head 12 by means of first support member 20 and second support member 22. Surface cleaning head 12 has a front end 24 having a front wall 26 (which is shown as transparent), a rear end 28 having a rear wall 30 (which is shown as transparent), side walls 32, top wall 34 and bottom wall 38.

The preferred embodiment of FIG. 1 provides a unique aesthetic appearance for a vacuum cleaner, or, optionally, a carpet sweeper (if, for example, no suction motor is provided in motor housing 18).

Figure 2:
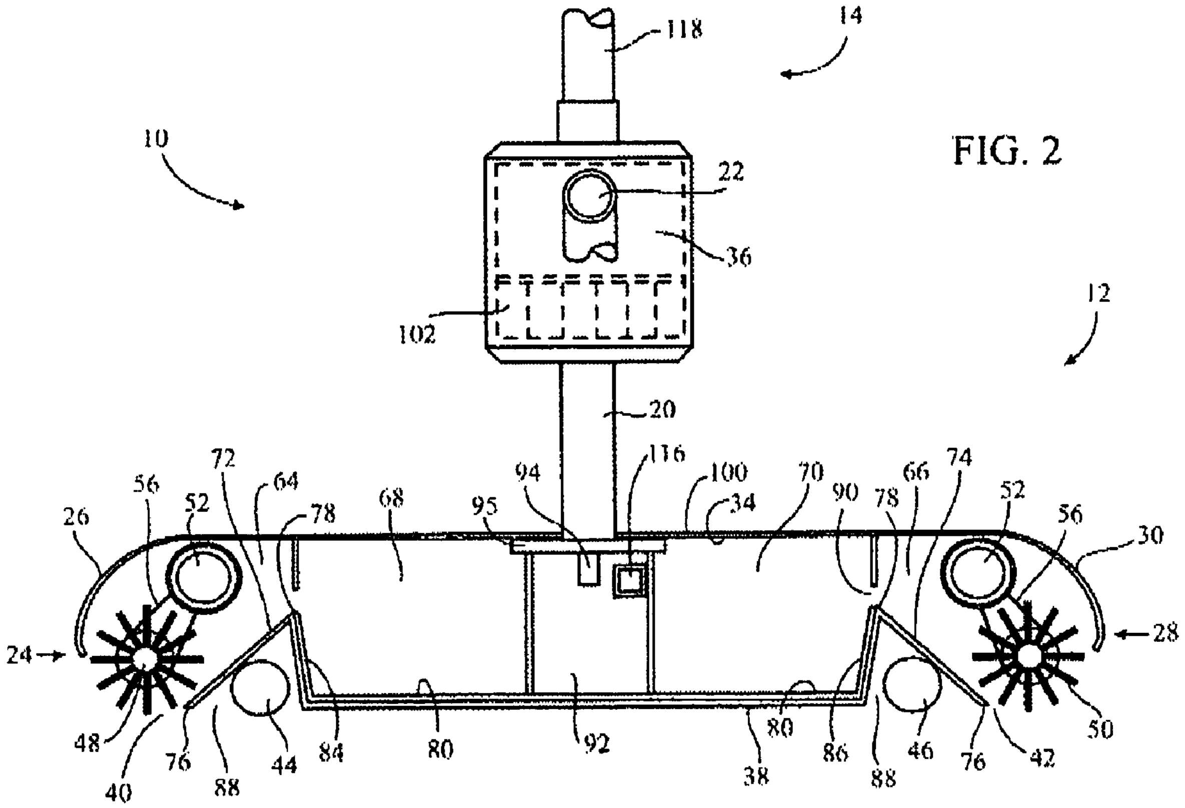
FIG. 2 is a cross section along the line 2-2 of FIG. 1 of a first preferred embodiment of this invention.
Figure 3:
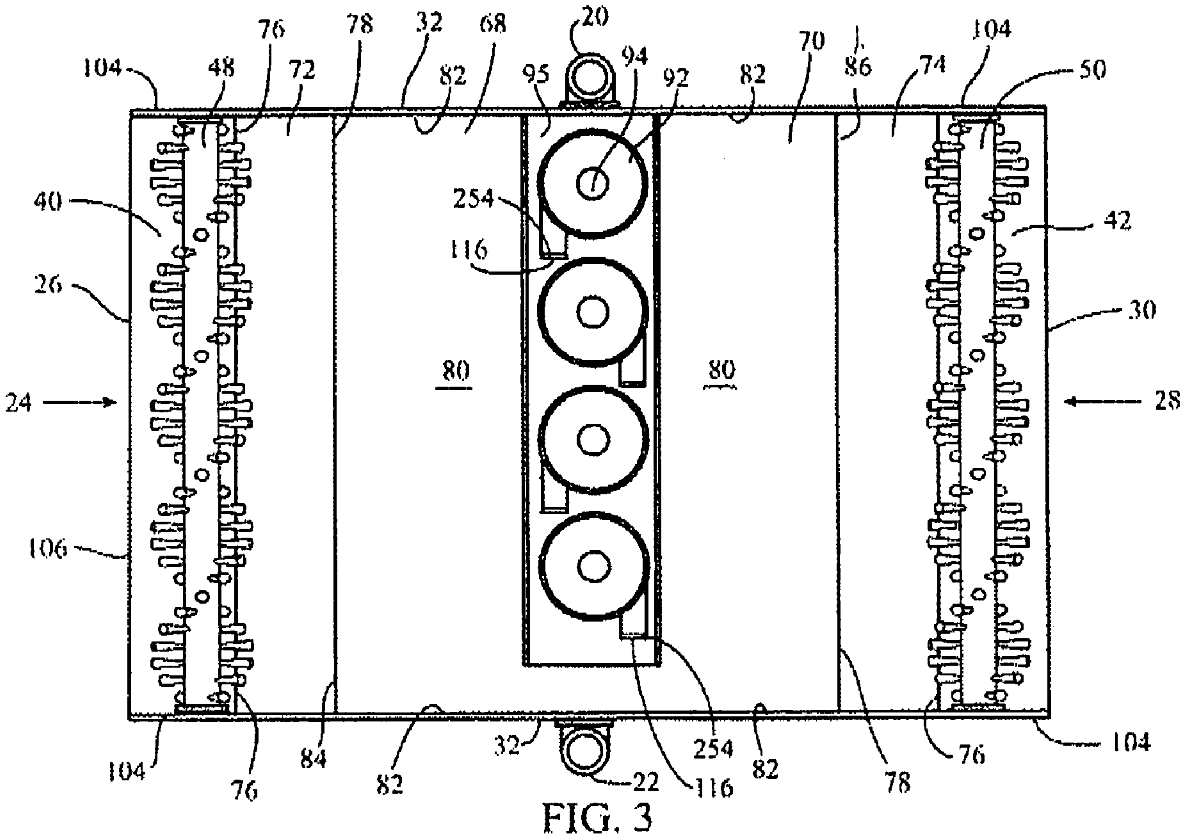
FIG. 3 is a top plan view of the surface cleaning head shown in FIG. 2 wherein the cover of the surface cleaning head has been removed.

As shown in FIGS. 2 and 3, surface-cleaning head 12 is provided with a bottom wall 38 having spaced apart forward and rearward dirty air inlets 40 and 42. Forward dirty air inlet is preferably positioned adjacent front end 24 and rearward dirty air inlet 42 is preferably positioned adjacent rear end 28. In order to permit suction cleaner head 12 to travel over a surface, front wheels 44 and rear wheels 46 are provided. Wheels 44, 46 may be any wheels known in the vacuum cleaner art and, alternately, may also be glide members or any other means known in the vacuum cleaner art to permit a surface cleaning head to be moved over a surface to be cleaned. Preferably, each inlet 40, 42 is provided with a mechanical agitator or the like to transport, or assist in transporting, particulate matter into dirty air inlets 40, 42. As shown in FIG. 2, forward dirty air inlet 40 is provided with front rotatably mounted brush 48 and rearward dirty air inlet 42 is provided with rear rotatably mounted brush 50. It will be appreciated that each of brushes 48 and 50 may be associated with their respective inlets 40 and 42 in any manner known in the art to provide the required mechanical action to convey particulate matter into inlets 40 and 42.

Rotatably mounted brushes 48, 50 may be driven by any drive means known in the art. For example, as shown in FIG. 2, an electric motor 52 is drivingly connected to each brush 48, 50 by a belt 56. Alternately, each brush 48, 50 may be driven by an air turbine, direct drive or other means known in the art (not shown).

Airflow passages 64, 66 are positioned downstream of dirty air inlets 40, 42. Airflow passages 64, 66 connect cyclonic dirt bin 100 with dirty air inlets 40, 42. An example of a construction for airflow passages 64, 66 is shown in FIG. 2. As shown therein, forward dirty air inlet 40 is provided with forward ramp 72 which has a lower end 76 positioned adjacent the surface to be cleaned and an upper end 78. Cyclonic dirt bin 100 is positioned rearward of the forward ramp 72. Similarly, rearward dirty air inlet 42 is provided with rearward ramp 74 which has a lower end 76 positioned adjacent the surface to be cleaned and an upper end 78. Cyclonic dirt bin 100 is positioned forward of the rearward ramp 72.

Figure 20:
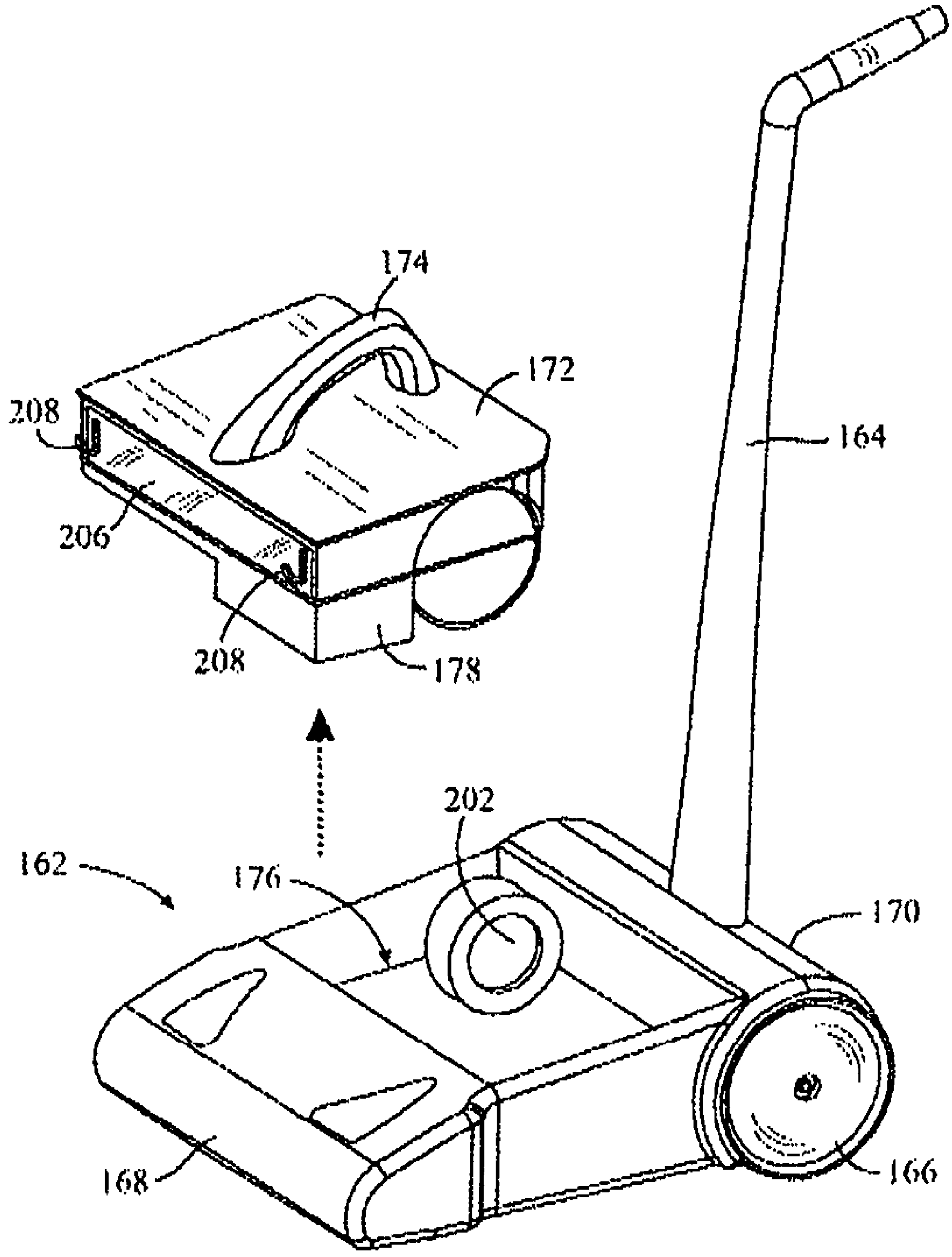
FIG. 20 is a perspective view of the alternate surface cleaning apparatus of FIG. 16 with both the dirt container and the access panel of the recess for receiving the dirt container removed from the surface cleaning head.

Cyclonic dirt bin 100 is configured to be removably mounted in vacuum cleaner 10. As shown in FIG. 1, cyclonic dirt bin 100 is received in the central portion of vacuum cleaner 10 between brushes 48, 50. Preferably, cyclonic dirt bin 100 is received in vacuum cleaner 10 by lowering cyclonic dirt bin 100 into a recess that opens upwardly (see for example FIG. 20). It will be appreciated that the dirt container may be mounted on an exterior surface of the surface cleaning apparatus (i.e., it need not be mounted in a recess of the surface cleaning apparatus). A handle may be provided on the upper surface of cyclonic dirt bin 100 to assist in placing cyclonic dirt bin 100 in vacuum cleaner 10 and also for removing cyclonic dirt bin 100 therefrom. Alternately, as shown in FIG. 20, the dirt container may be mounted on a portion of the surface cleaning apparatus that is moveably mounted with respect to the recess in which the dirt container is positioned.

As shown in FIGS. 2 and 3, in one embodiment, cyclonic dirt bin 100 has a plurality of cyclones 92 and a dirt collection area 68, 70 positioned either side of the cyclones 92. It will be appreciated that if vacuum cleaner 10 has only one brush then cyclonic dirt bin 100 may have only a single dirt collection area. Further, it will be appreciated that cyclonic dirt bin 100 may have only one cyclone. In addition, in an alternate embodiment, cyclonic dirt bin 100 may not have a first stage dirt collection area 68, 70. It will be appreciated that dirt collection areas 68, 70 are not isolated from each other (i.e. they do not have a centrally positioned wall adjacent cyclones 92 dividing cyclonic dirt bin 100 in two halves. However, in an alternate construction, dirt collection areas 68, 70 may be separate chambers. As shown in FIG. 2, forward dirt collection area 68 is provided rearwardly (downstream) of forward ramp 72. Similarly, rearward dirt collection area 70 is provided forwardly (downstream) of rearward ramp 74. It will be appreciated that ramps 72, 74 may be of the same or different construction. Similarly, dirt collection areas 68, 70 may be of the same or different construction.

Dirt collection areas 68, 70 are constructed so as to act as a first stage filtration member wherein heavier particulate matter will be collected due to the action of gravity on the particulate matter. Accordingly, heavier particulate matter that is swept up by a brush 48, 50 may be collected therein. Further, as the air stream travels through or across dirt collection area 68, 70 to the cyclones 92, some of the particulate matter in the air stream may settle out prior to proceeding to suction motor 36. Thus, only the finer particulate matter will have to be removed by the cyclones 92. Thus cyclones 92 may be sized to remove and store only a limited amount of particulate material.

Figure 7:
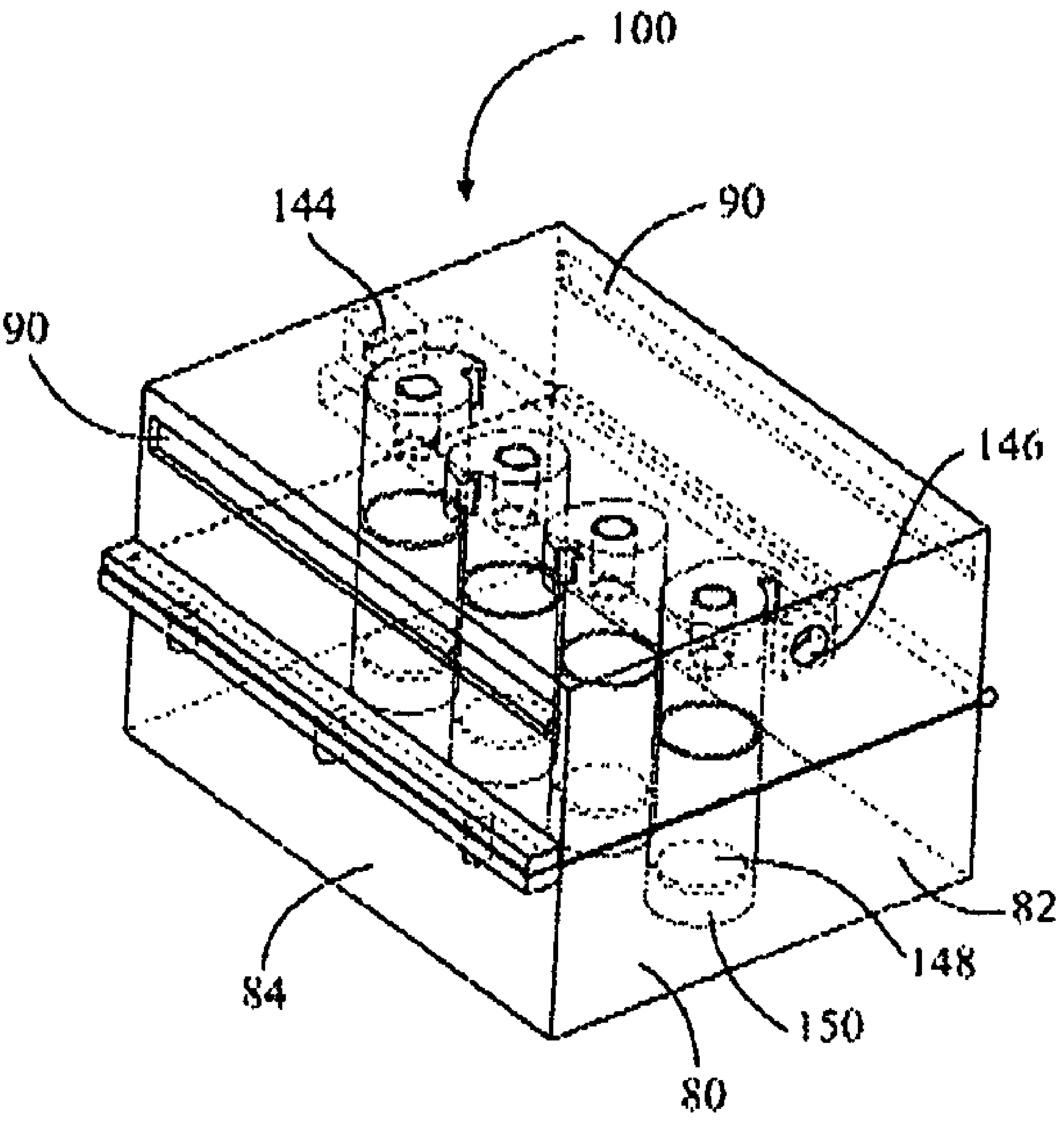
FIG. 7 is a perspective view of the dirt container of FIG. 5 in the assembled configuration.
Figure 8:
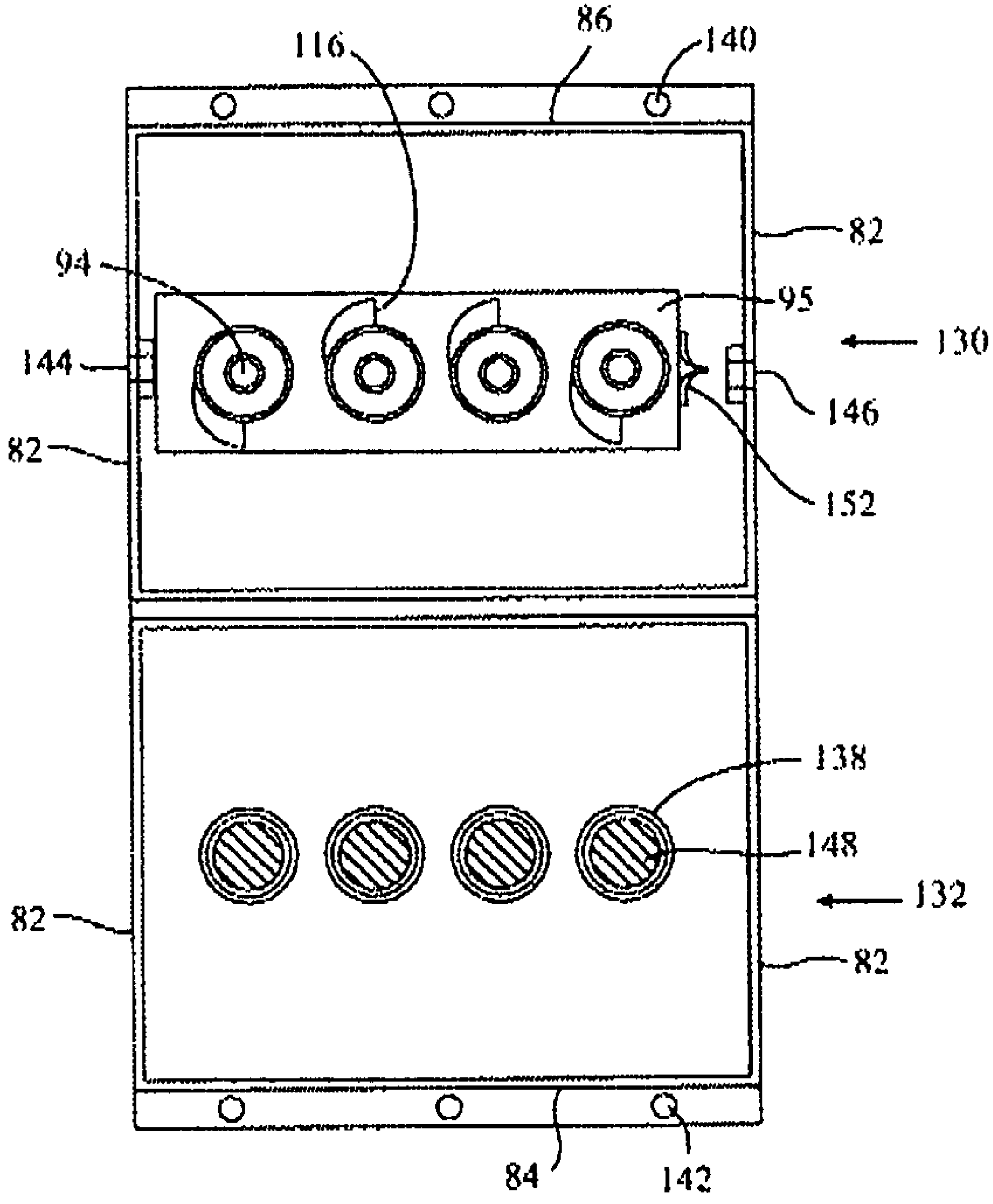
FIG. 8 is a top plan view of the dirt container of FIG. 5 in the disassembled configuration.

As shown in FIGS. 2 and 7, cyclonic dirt bin 100 has an inlet 90 positioned in first lateral wall 84 in airflow communication with forward airflow passage 64 and an inlet 90 positioned in second lateral wall 86 in airflow communication with rearward airflow passage 66 when vacuum cleaner 10 is in operation. Accordingly, dirt separation areas 68, 70 have a bottom surface 80 that is recessed below top 78 of ramp 72, 74 so as to provide a dirt collection area which is spaced from the air flow traveling therethrough so that the dirt that settles out is generally not re-entrained by the air stream. Sidewalls 82 extend between lateral walls 84, 86.

As shown in FIG. 2, wheels 44, 46 are provided in recess 88 that is provided on the lower side of ramps 72, 74. However, wheels 44, 46 may be at any other position known in the vacuum cleaner art.

In operation, particulate matter will be entrained by an air stream entering dirty air inlets 40, 42 and/or will be swept up ramp 72 by brush 48, 50. The heavier material, such as that which is swept up ramp 72, will be conveyed past upper ends 78 of the ramps and will be deposited in dirt collection areas 68, 70. The air stream passing through dirt collection areas 68, 70 will travel across the upper portion of dirt collection areas 68, 70 leaving a lower portion, which is relatively quiescent. Accordingly, particulate matter that accumulates on bottom wall 80 of dirt collection areas 68, 70 will not be re-entrained. Accordingly, dirt collection areas 68, 70 comprise a first stage dirt separation area that operates by gravity. Any particulate matter that is not entrained in the air stream as the air stream enters cyclones 92 will be deposited in dirt collection areas 68, 70. Accordingly, the larger particulate matter will be removed from the air stream leaving the finer particulate matter to be separated in one or more subsequent filtration steps downstream of dirt collection areas 68, 70.

Cyclones 92 may be constructed in any manner known in the cyclonic art and, similarly, the air inlets to cyclone 92 may be constructed in any manner known in the cyclone art. In an alternate embodiment, it will be appreciated that each dirt collection area 68, 70 may communicate with a separate cyclone 92. Alternately, they may each communicate with a single cyclone 92. Advantageously a plurality of cyclones is provided to reduce the backpressure across cyclonic dirt bin 100. As the larger particulate matter has been removed by the passage of the air streams through dirt collection areas 68, 70, cyclones 92 may be designed only to treat the finer particulate matter that remains in the air streams. In order to prevent larger or elongate particulate matter, such as hair, from entering cyclone 92, a screen, deflector or the like 254 may be provided proximate the inlets to cyclones 92. Typically, a substantial portion of the volume of particulate matter that is collected by a vacuum cleaner comprises larger particulate matter. Accordingly, for a vacuum cleaner designed for a conventional household, cyclones 92 may be expected only to treat a relatively small amount of particulate matter. Therefore, cyclones 92 may be relatively small and, in fact, may be sufficiently small to fit within surface cleaning head 12 wherein surface cleaning head 12 may have a vertical height comparable to existing upright vacuum cleaner heads. Accordingly, in a more preferred embodiment, cyclonic dirt bin 100 is provided in surface cleaning head 12, although it will be appreciated that cyclonic dirt bin 100 may be provided at any other convention position in a vacuum cleaner (e.g. in an upper body portion or in a canister housing).

In one embodiment, a suction motor or the like may be provided in surface cleaning head 12. The filtered air may be passed through the suction motor to cool the suction motor and then exhausted such as through an opening provided in top wall 34. In accordance with the preferred embodiment shown in FIGS. 2 and 3, the filtered air after exiting cyclonic dirt bin 100 is conveyed through up flow duct 20 to suction motor 36 (see FIG. 4). In this embodiment, suction motor 36 is a clean air motor since the dirty air stream has already been filtered prior to reaching the impeller of suction motor 36. The treated air stream may also be passed through or by suction motor 36 to cool the motor and may then be exhausted to the ambient through an opening that may be provided, e.g., in motor housing 18.

Figure 4:
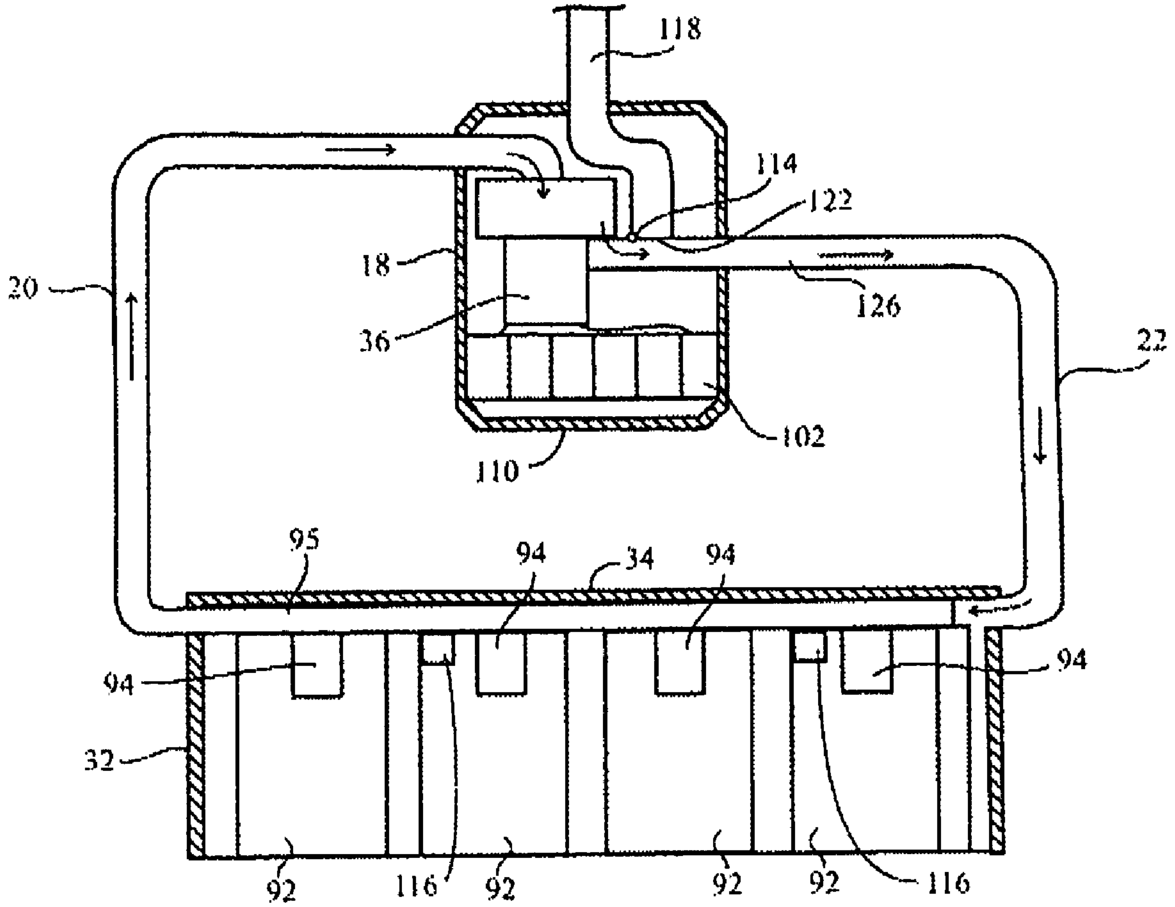
FIG. 4 is a cross section along the line 4-4 in FIG. 1 of the vacuum cleaner in accordance with the preferred embodiment of FIGS. 2 and 3 when the vacuum cleaner is in the floor cleaning mode.

If vacuum cleaner 10 is battery powered, then the batteries may be provided at any location in appliance 10. Preferably, in the embodiment of FIG. 4, batteries 102 are provided in or adjacent motor housing 18. As shown in FIGS. 2 and 4, batteries 102 may be provided directly beneath motor 36 and some or all of the clean air traveling through up duct 20 may be passed through or by batteries 102 so as to cool the batteries during operation of vacuum cleaner 10. An advantage of positioning batteries 102 adjacent motor 36 is that the amount of wiring required to connect batteries 102 with motor 36 is substantially reduced. Further, if batteries 102 are provided as a battery pack, then the battery pack may plug directly into motor 36.

As shown in FIG. 1, up flow duct 20 and down flow duct 22 may be used to pivotally attach motor housing 18 to surface cleaning head 12 and, preferably, to side walls 32 of surface cleaning head 12. Accordingly, ducts 20 and 22 may be structural elements that are used to convey the push force supplied by a consumer on handle 16 to floor cleaning head 12 to move surface cleaning head 12. Accordingly, ducts 20 and 22 may be constructed from any material known in the art that is capable of withstanding normal stresses applied to these members during normal operation of appliance 10. Accordingly, ducts 20 and 22 may be constructed from plastic and, preferably, from metal.

In one preferred embodiment, each side wall 32 of surface cleaning head 12 has a portion 33 that is recessed inwardly so that the outer extent of ducts 20, 22, or the pivot assembly to which they are attached, does not extend outwardly beyond side walls 104 of brush housing 106. Accordingly, brushes 48, 50 may extend essentially across the entirety of the width of surface cleaning head 12 and may clean adjacent a wall without ducts 20, 22 or the pivot means interfering with the placement of side walls 104 adjacent to a wall of a room being cleaned. Accordingly, by providing a recess in side walls 32, surface cleaning head 12 may clean adjacent a wall even with an air flow duct extending outwardly from the side walls 32.

Preferably, ducts 20 and 22 are pivotally mounted to side walls 32 at a position above top wall 108 of brush housing 106. In addition, more preferably, ducts 20 and 22 have a sufficient vertical height such that motor and handle assembly 14 may be pivoted rearwardly in the direction of arrow A (see FIG. 1) so as to be positionable adjacent the surface being cleaned without bottom wall 110 of motor housing 18 contacting any portion of surface cleaning head 12. Accordingly, the maximum vertical extent of vacuum cleaner 10 when motor and handle assembly 14 is pivoted to be adjacent the surface being cleaned, may be top wall 34 of surface cleaning head 12. Accordingly, handle and motor assembly 14 may not impede the passage of surface cleaning head 12 underneath furniture or the like. A further advantage of this construction is that the filtration means in surface cleaning head 12 may be accessed for emptying merely by rotating handle and motor assembly 14 downwardly and then lifting top wall 34, which may accordingly function as an access panel) off of surface cleaning head 12 by means of a handle.

A vacuum cleaner appliance utilizing surface cleaning head 12 may also be adapted for above floor cleaning. Accordingly, an above floor cleaning wand 118 may be connectable in air flow communication with suction motor 36. Preferably, handle 16 is a hollow tubular element, which is mounted on hollow wand 118. Wand 118 may be selectively connectable in air flow communication with suction motor 36 by any means known in the art. Wand 118 may be slidably received in flexible hose 120. When wand 118 is unlocked and pulled upwardly out of flexible hose 120, a valve may be automatically opened connecting the lower portion of wand 118 in air flow communication with suction motor 36. Alternately, a manual valve may be provided, which is actuated by the consumer.

When wand 118 is removed for above floor cleaning, one or more valves are preferably actuated and, more preferably automatically actuated, so as to isolate wand 118 from return duct 126 so that all of the suction produced by suction motor 36 will be directed through wand 118. An example of such a valving arrangement is shown in FIG. 4.

As shown in FIG. 4, return airflow passage 126 may be provided with valve 122, which is pivotally mounted by means of pivot 114 between an open position and a closed position. As shown in FIG. 4, valve 122 closes the bottom portion of wand 118. Thus, the air passing through up flow duct 20 passes through motor 36 to cool the motor and then through the interior of motor housing 18 to optionally cool the batteries and is then exhausted from the vacuum cleaner by any means known in the art.

In operation, wand 118 is disengaged from upper return airflow passage 126 causing valve 122 to pivot and connect wand 118 in air flow communication with passage 126. Wand 118 will then be in airflow communication with down flow duct 22, which is in airflow communication with up flow duct 20 via cyclonic dirt bin 100. The dirty air stream that is collected via wand 118 travels through down flow duct 22 and enters chambers 68, 70. The larger particulate matter in the airflow stream will settle out in chambers 68, 70. The partially cleaned air will enter cyclones 92 via cyclone inlets 116 (which may be provided with a deflector, grill, mesh or the like to prevent larger particulate matter such as hair form entering cyclones 92). The treated air will exit cyclone 92 via outlet 94 and will be conveyed to suction motor 36 via header 95 for up flow duct 20.

It will be appreciated that floor cleaning head 12 may be provided with only one brush 48, 50 and one dirt collection area 68, 70 and still advantageously use a number of the novel constructions described herein.

Figure 5:
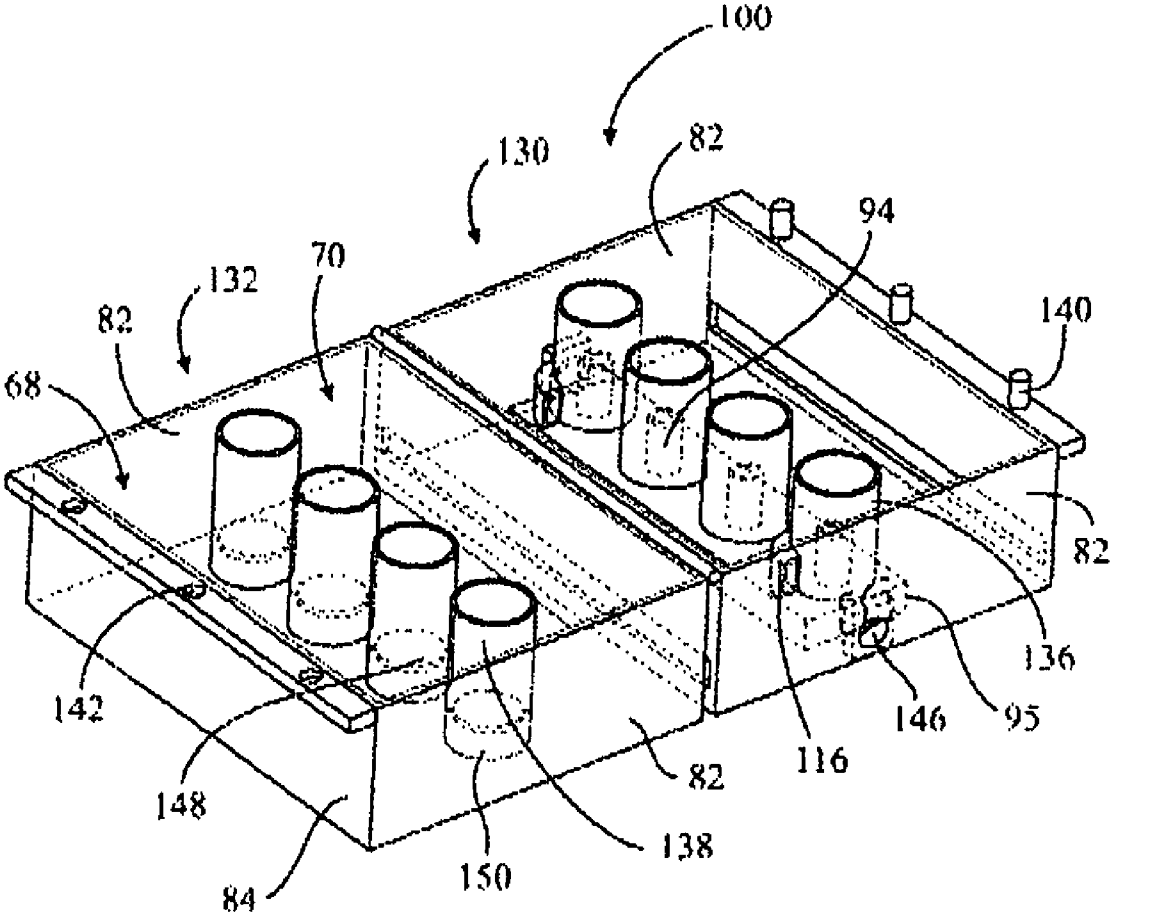
FIG. 5 is a perspective view of a dirt container in the disassembled configuration according to a preferred embodiment of the instant invention.
Figure 6:
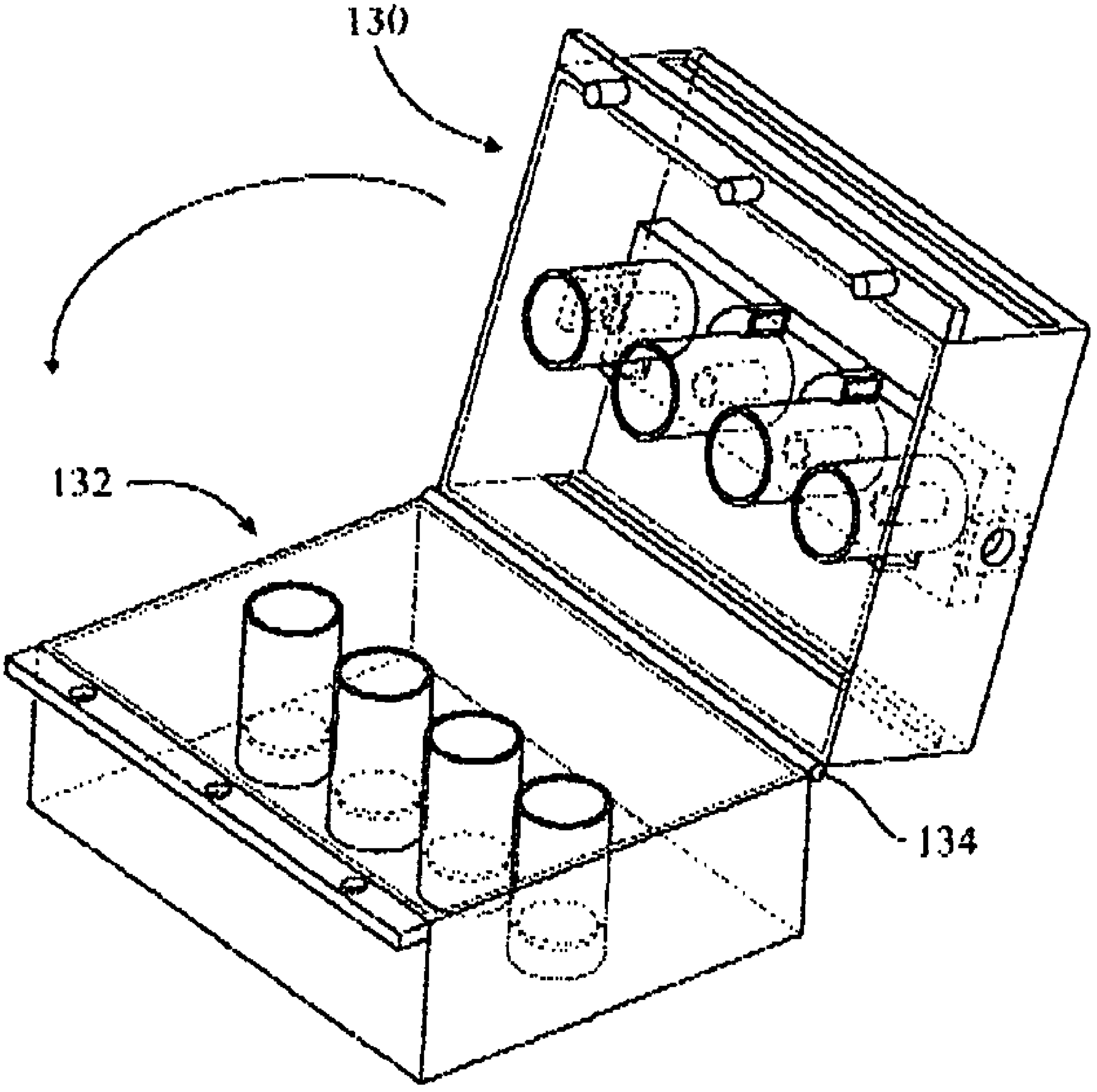
FIG. 6 is a perspective view of the dirt container of FIG. 5 being reconfigured to the assembled configuration.

Preferably, cyclonic dirt bin 100 is comprised from at least two portions that are configurable between a disassembled configuration (e.g. as shown in FIG. 5) and an assembled configuration (e.g. as shown in FIG. 7). Preferably, when in the disassembled configuration, cyclonic dirt bins 100 are at least partially nestable in each other. An example of such a construction of cyclonic dirt bin 100 is shown in more detail in FIGS. 5-8. As shown therein, cyclonic dirt bin 100 comprises two portions, namely upper portion 130 and lower portion 132, which are pivotally connected together by pivot 134. It will be appreciated that upper portion 130 and lower portion 132 may be movable in any manner relative to each other so as to produce cyclonic dirt bin 100 in the assembled configuration. For example, in one embodiment, upper portion 130 and lower portion 132 may be separately molded portions which are securable into the assembled configuration shown in FIG. 7 such as by means of male and female engagement members, an adhesive or other securing means known in the mechanical or chemical arts. Alternately, upper and lower portions 130, 132 may be molded as a single unit and include a flexible portion (e.g. flange) so as to allow one portion to rotate relative to the other portion to form an assembled dirt bin. It will also be appreciated that while an embodiment showing two portions that are pivotally connected together has been exemplified, the outer shell of cyclonic dirt bin 100 may be assembled from a plurality of portions which are movabley mounted with respect to each other.

In the preferred embodiment shown in FIG. 5, cyclonic dirt bin 100 is made from thin walled plastic (such as by injection or vacuum molding) and pivot or hinge 134 comprises an integrally molded strip of material that is deformable so as to form a hinge. Preferably, the exterior walls of cyclonic dirt bin 100 are sufficiently thick so as to enable cyclonic dirt bin 100 to maintain its shape, such as when it is removed from vacuum cleaner 10 and is transported to a garbage bin. The actual wall thickness which is required to provide sufficient rigidity for cyclonic dirt bin 100 to maintain its shape without any external support being applied thereto will vary depending upon the strength of the material which is utilized to construct cyclonic dirt bin 100. Preferably, cyclonic dirt bin 100 is constructed from plastic and has a wall thickness of about 0.3 mm or more. Preferably, the exterior walls of cyclonic dirt bin 100 are less than about 1 mm thick. At 1 mm thickness, the walls provide a substantial amount of rigidity for a disposable bin. Accordingly, in order to preserve natural resources, it is preferred to use wall thicknesses less than about 1 mm. In an alternate embodiment, it will be appreciated that cyclonic dirt bin 100 could be designed so as to be emptied once or twice before its disposal. Accordingly, upper and lower portions 130 and 132 may be releasably engagable together. This would permit cyclonic dirt bin 100 to be opened and emptied (if desired). Alternately, a door or the like could be provided so as to permit cyclonic dirt bin 100 to be emptied. In such a case, the exterior walls of cyclonic dirt bin 100 may be thicker than about 1 mm so as to permit the dirt bin to be emptied a few times.

Upper portion 130 may be provided with header 95 and the upper portions 136 of cyclones 92 (which include outlets 94 and inlets 116). Lower portion 132 is provided with lower portions 138 of cyclones 92. Header 95 is provided with an outlet 144 that is in fluid flow communication with up flow duct 20 when bin 100 is in vacuum cleaner 10. Bin 100 is also provided with an inlet 146 that is in fluid flow communication with down flow duct 22 when bin 100 is in vacuum cleaner 10. When upper and lower portions 130, 132 are pivoted to the closed position to provide a sealed dirt bin 100 as shown in FIG. 7, upper and lower portions 136, 138 mate to define a sealed cyclone chamber other than inlet and outlet 116, 94. It will be appreciated that cyclones 92 may be of any particular construction. In addition, all of a cyclone 92 may be provided either in upper or lower portion 130, 132. It will be appreciated that cyclones 92 may be molded integrally with upper and lower portions 130, 132 or that they may be molded separately and inserted into cyclonic dirt bin 100.

Upper and lower portions 130, 132 are also provided with male and female engagement means to secure bin 100 in the closed position of FIG. 7. As shown in FIG. 5, upper portion 130 is provided with a plurality of protrusions 140 that are lockingly received in mating openings 142. It will be appreciated that other physical engagement means or an adhesive may be utilized to secure portions 130, 132 in the closed position.

A separator plate 148 may be provided in the lower portion of cyclone 92 to create a dirt collection chamber 150 as is known in the art.

A deflector 152 may be provided so that the air stream entering via inlet 146 does not travel directly to inlets 116 to cyclones 92 but instead dissipates so as to allow heavier material to settle out via gravity.

Figure 9:
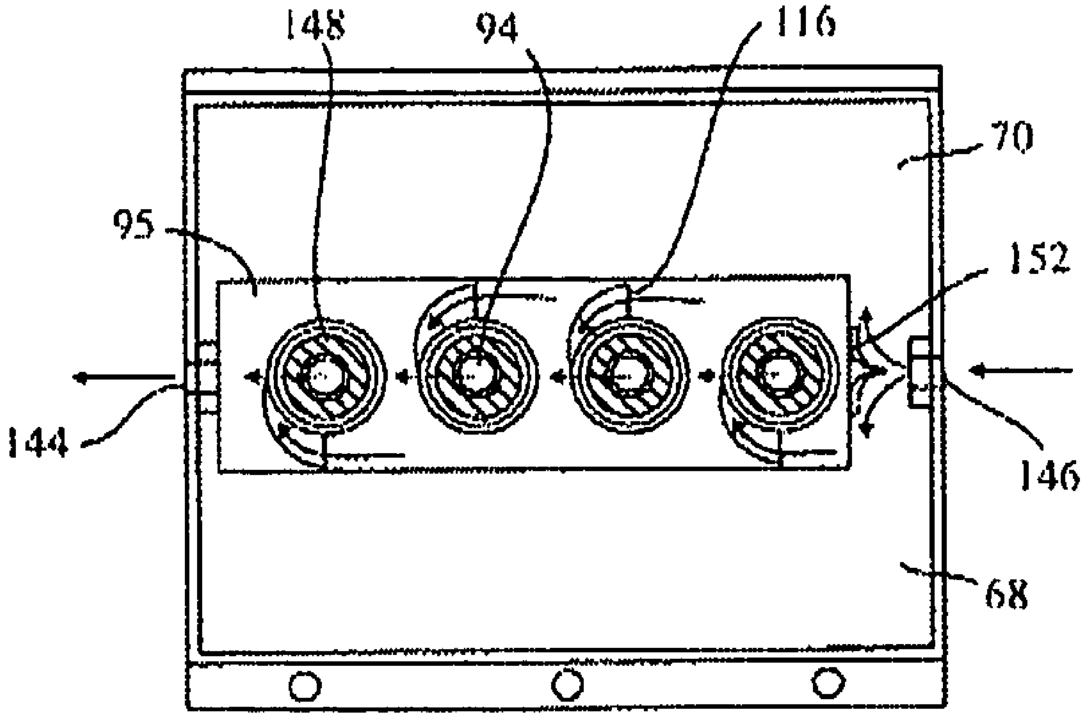
FIG. 9 is a top plan view of the dirt container of FIG. 5 in the assembled configuration and with the upper surface shown as transparent.
Figure 11:
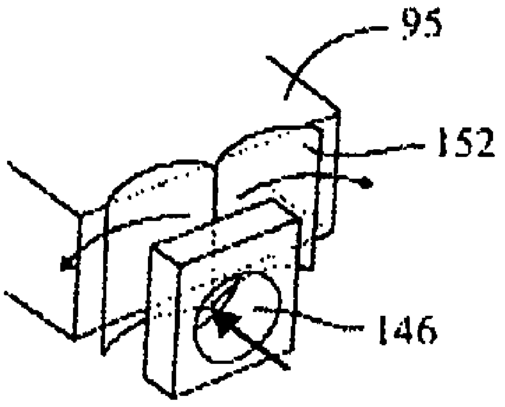
FIG. 11 is an enlargement of the air inlet shown in area A of FIG. 10.
Figure 10:
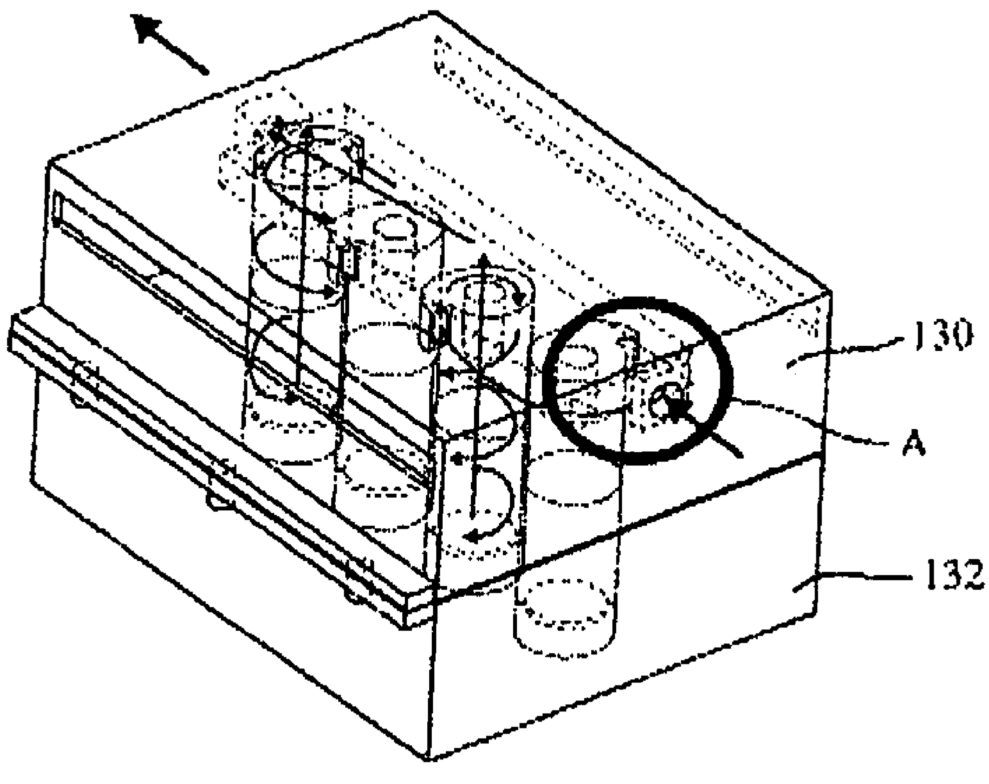
FIG. 10 is a perspective view of the dirt container of FIG. 5 in the assembled configuration, with the upper surface shown as transparent and showing the air flow pattern through the dirt container when the vacuum cleaner is in use.
Figure 13:
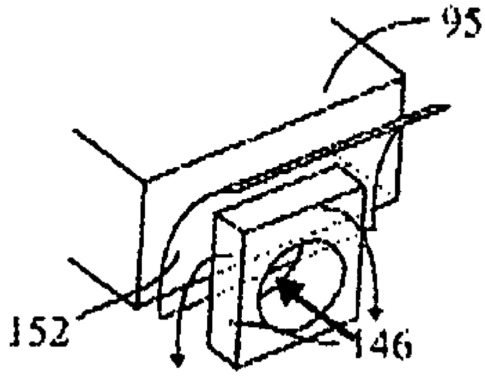
FIG. 13 is an enlargement of the air inlet shown in area B of FIG. 12.
Figure 12:
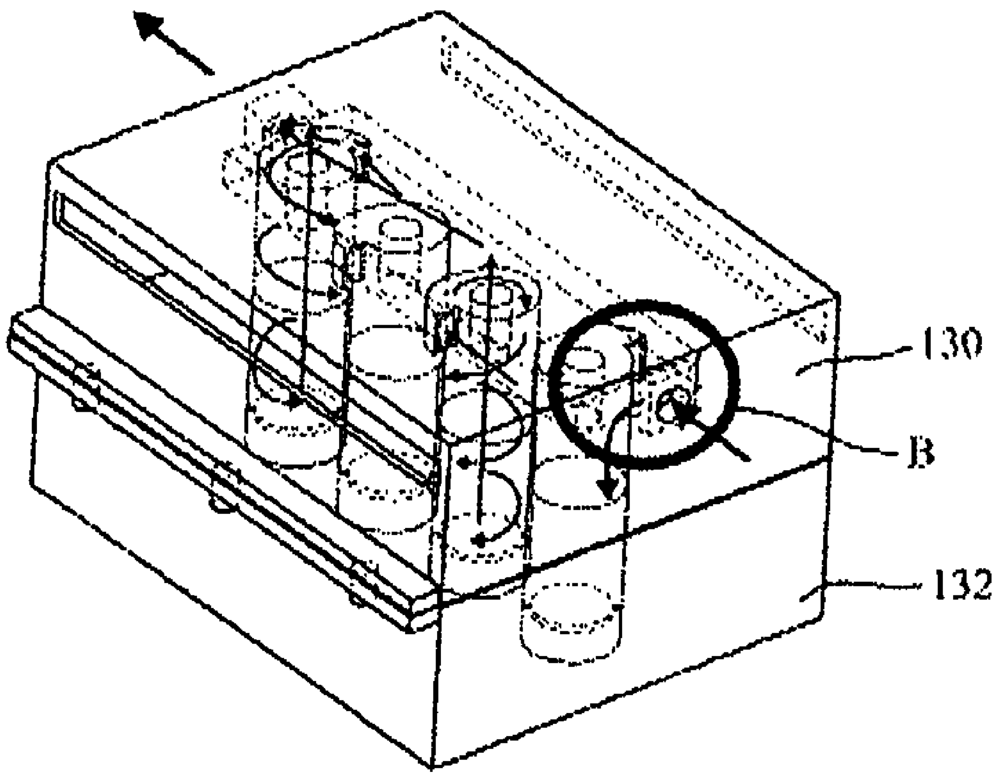
FIG. 12 is a perspective view of an alternate dirt container in the assembled configuration, with the upper surface shown as transparent and showing the air flow pattern through the alternate dirt container when the vacuum cleaner is in use.

As shown in FIGS. 9-11, a dirty air stream from wand 118 enters bin 100 via inlet 146 and encounters deflector 152. The air stream is directed into chambers 68, 70. The heavier particulate matter settles out in chambers 68, 70 and the air stream containing the finer and lighter particulate matter travels to inlets 116 of cyclones 92. Finer particulate matter is removed in cyclones 92 and the treated air exits cyclones 92 via outlets 94 to header 95. Header 95 functions to connect the plurality of cyclones 92 with up flow duct 20 via outlet 144. It will be appreciated that if a single cyclone 92 is provided, then outlet 94 of the single cyclone may connect directly with up flow duct 20. Alternately, outlets 94 may connect with duct 20 without a header 95. In the alternate embodiment of FIGS. 12, 13, deflector 152 directs the dirty air stream from wand 118 downwardly.

Figure 14:
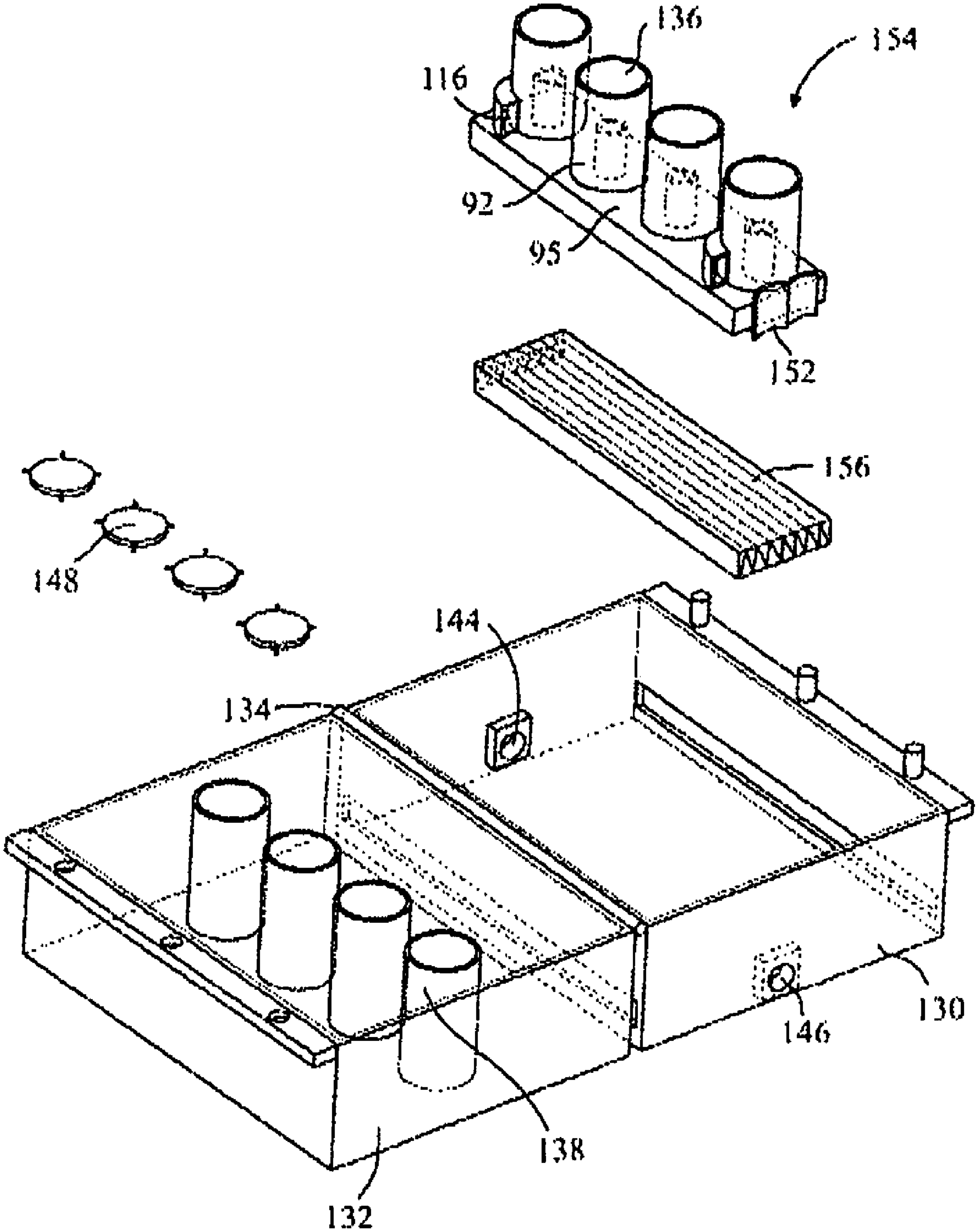
FIG. 14 is an exploded view of the dirt container of FIG. 5.

A preferred assembly for bin 100 is shown in FIG. 14. As shown in FIG. 14, lower portions 138 of cyclones 92 are molded integrally with bin 100. Upper portions 136 of cyclones 92 are molded separately and, preferably, integrally with header 95 as a construction 154. Optional separator plates are molded separately from lower portions 138 of cyclones 92. Cyclonic dirt bin 100 may than be assembled by construction 154 into upper portion 130. Construction 154 may be secured in place by a snap fit, an adhesive or any other means known in the art. Separator plates 148 may then be inserted into lower portions 138 of cyclones 92 and secured therein by a snap fit, an adhesive or any other means known in the art. An optional post cyclone filter 156 (which may be a HEPA filter, a foam filter, an electrostatic filter or any other filter element known in the art) may be placed in header 95 before construction 154 is placed in upper portion 130.

Figure 15:
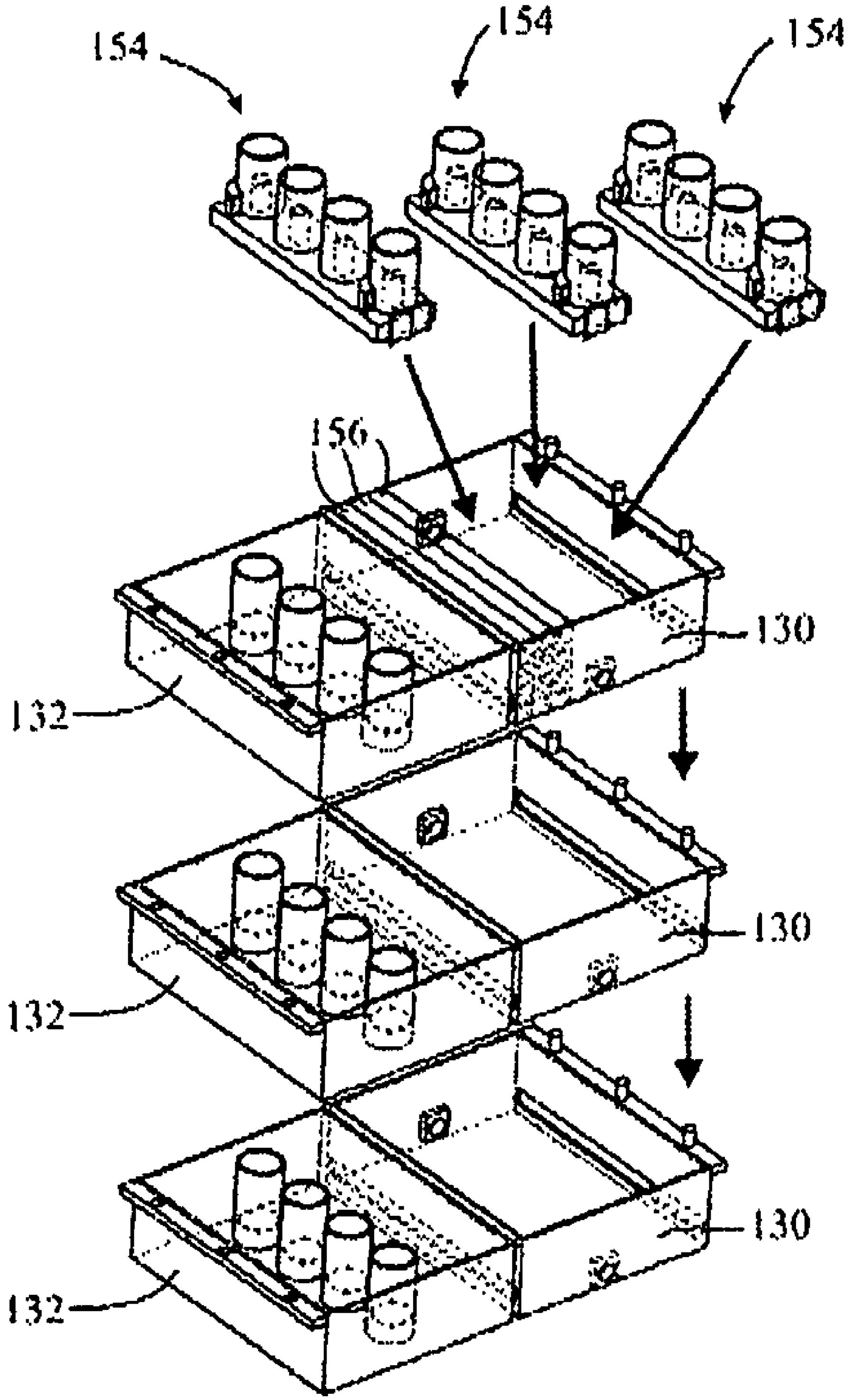
FIG. 15 is an exploded view of three dirt containers nested for storage.

An assembly of three bins 100 in the disassembled state is exemplified in FIG. 15. Upper and lower portions 130, 132 may be configured to be nestable (e.g. the lateral and side walls 82, 84, 86 may be at an angle to the vertical so that bottom 80 and the top of bin 100 are narrower than the middle portion of bin 100 when assembled—i.e. the top of portions 130, 132 when in the disassembled configuration). Three filters 156, three headers 95 and upper cyclone portions constructions 154 may be inserted into upper portion 130 of the uppermost nested bin 100. Thus, a compact assembly of bins 100 may be provided for purchase by a consumer.

Figure 16:
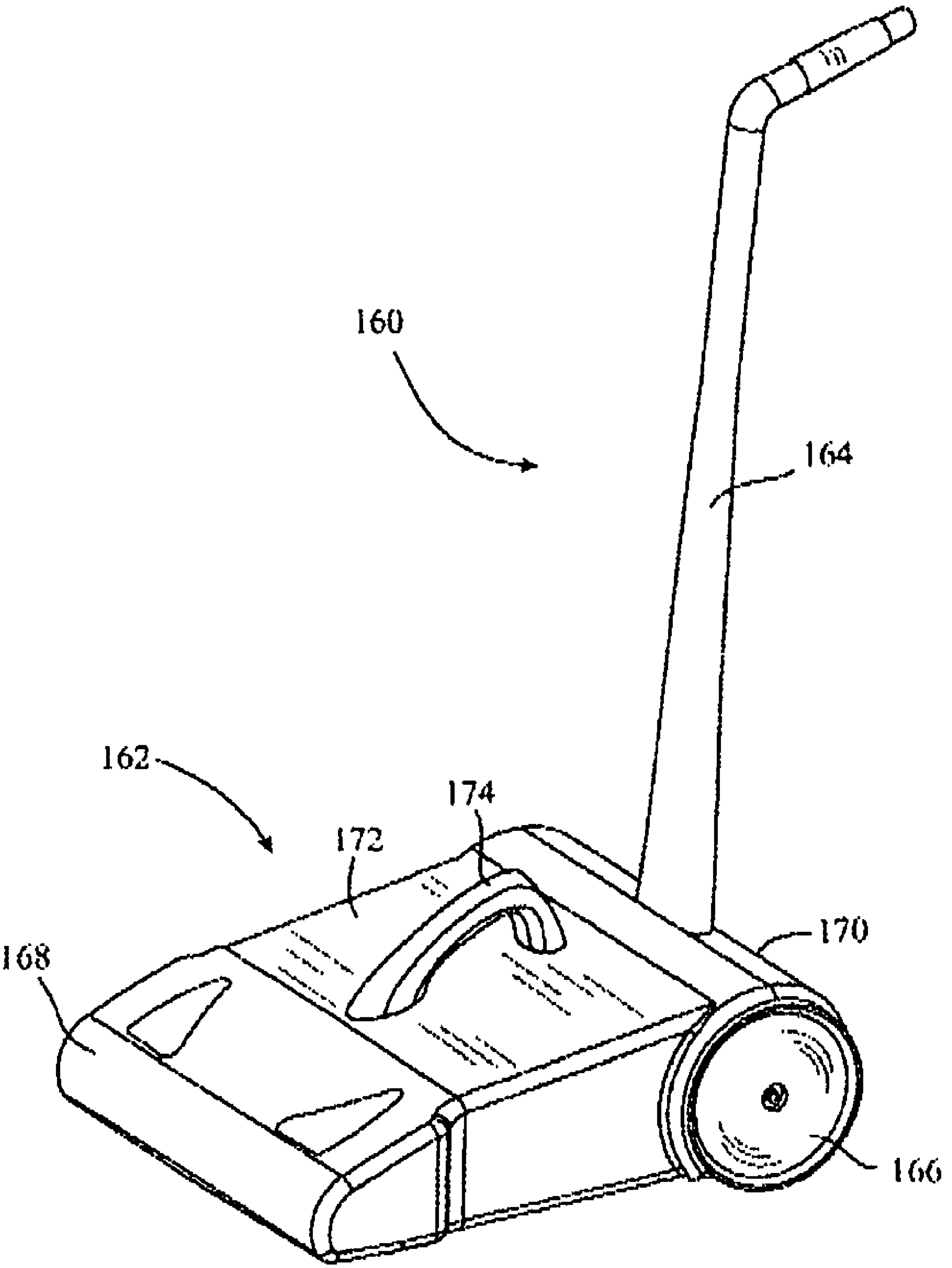
FIG. 16 is a perspective view of an alternate surface cleaning apparatus using a dirt container according to the instant invention.

An alternate embodiment is shown in FIG. 16. As shown in FIG. 16, surface cleaning apparatus 160 comprises a surface cleaning head 162 and handle 164 pivotally mounted thereto. Surface cleaning apparatus 160 has rear wheels 166 and may optionally have front wheels (not shown) if desired. Surface cleaning head 162 has a front end 168, a rear end 170 and a top cover or access panel 172. Top cover 172 is removably upwardly, by means of handle 174, so as to reveal recess 176 (see FIG. 20). A dirt container 178 may be removably mounted on the lower surface of top cover 172 (see FIG. 20).

Figure 17A:
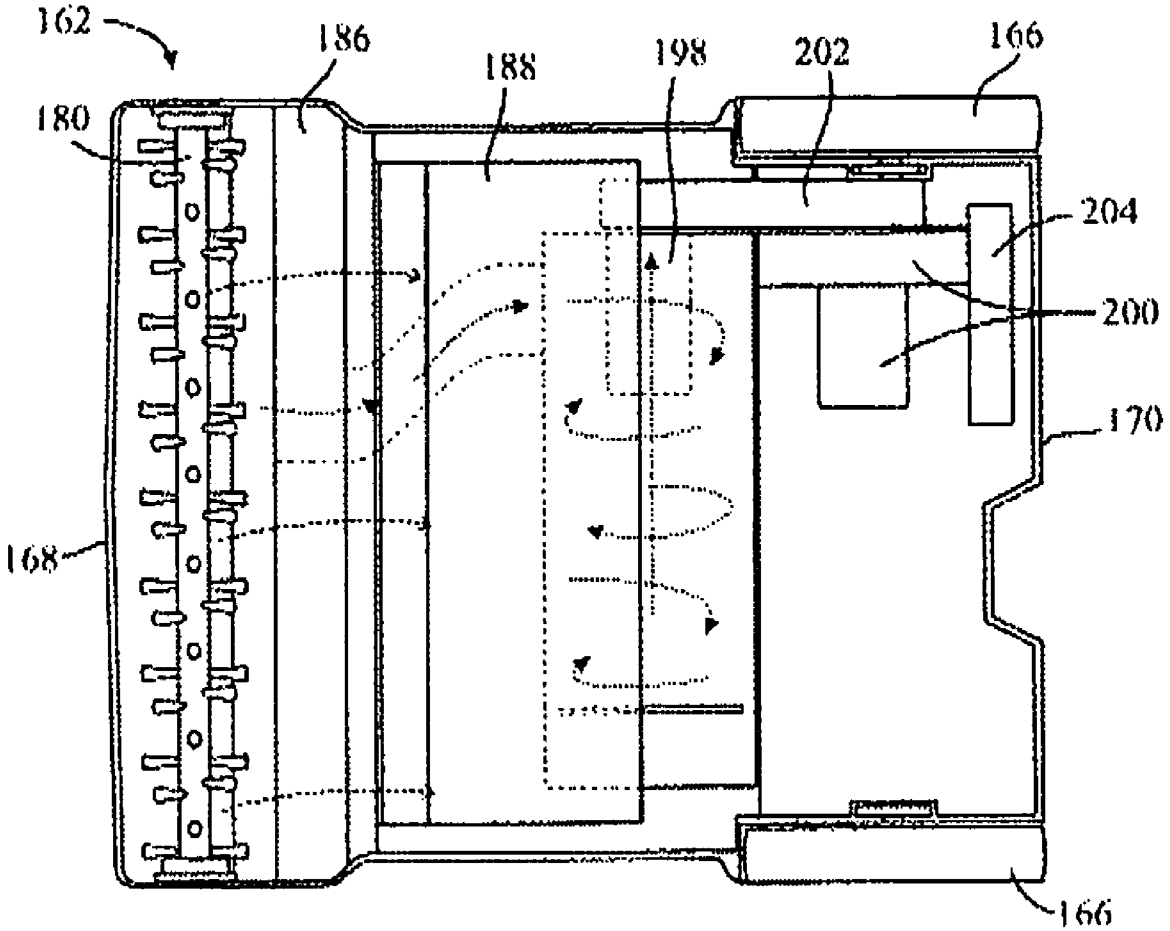
FIG. 17A is a top plan view, with the cover of the surface cleaning head removed, of the surface cleaning head of FIG. 16.
Figure 17B:
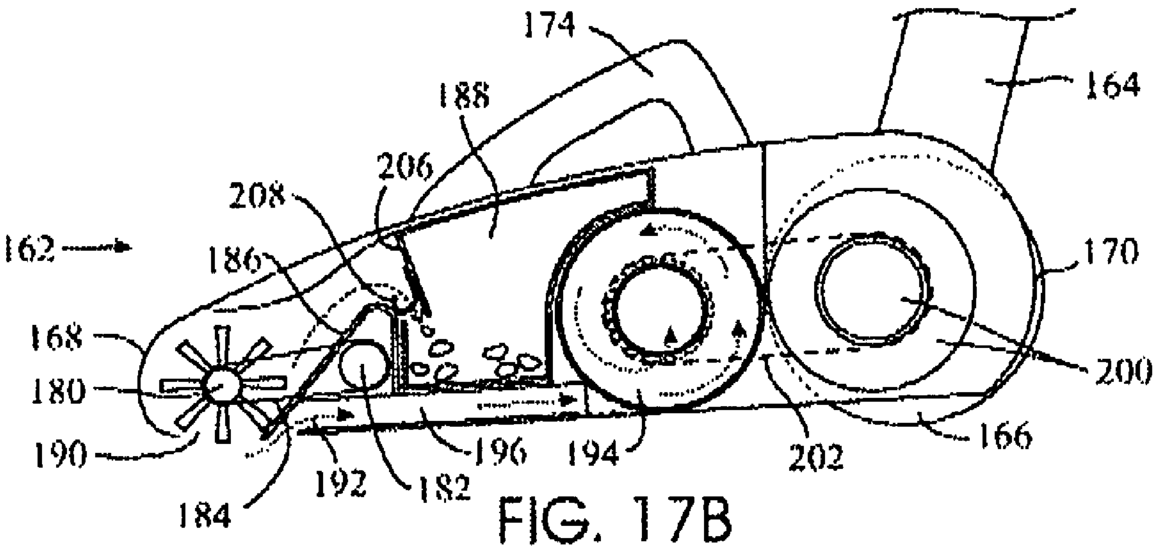
FIG. 17B is a side elevation view of the surface cleaning head of FIG. 17A, with the side panel of the surface cleaning head removed.
Figure 18:
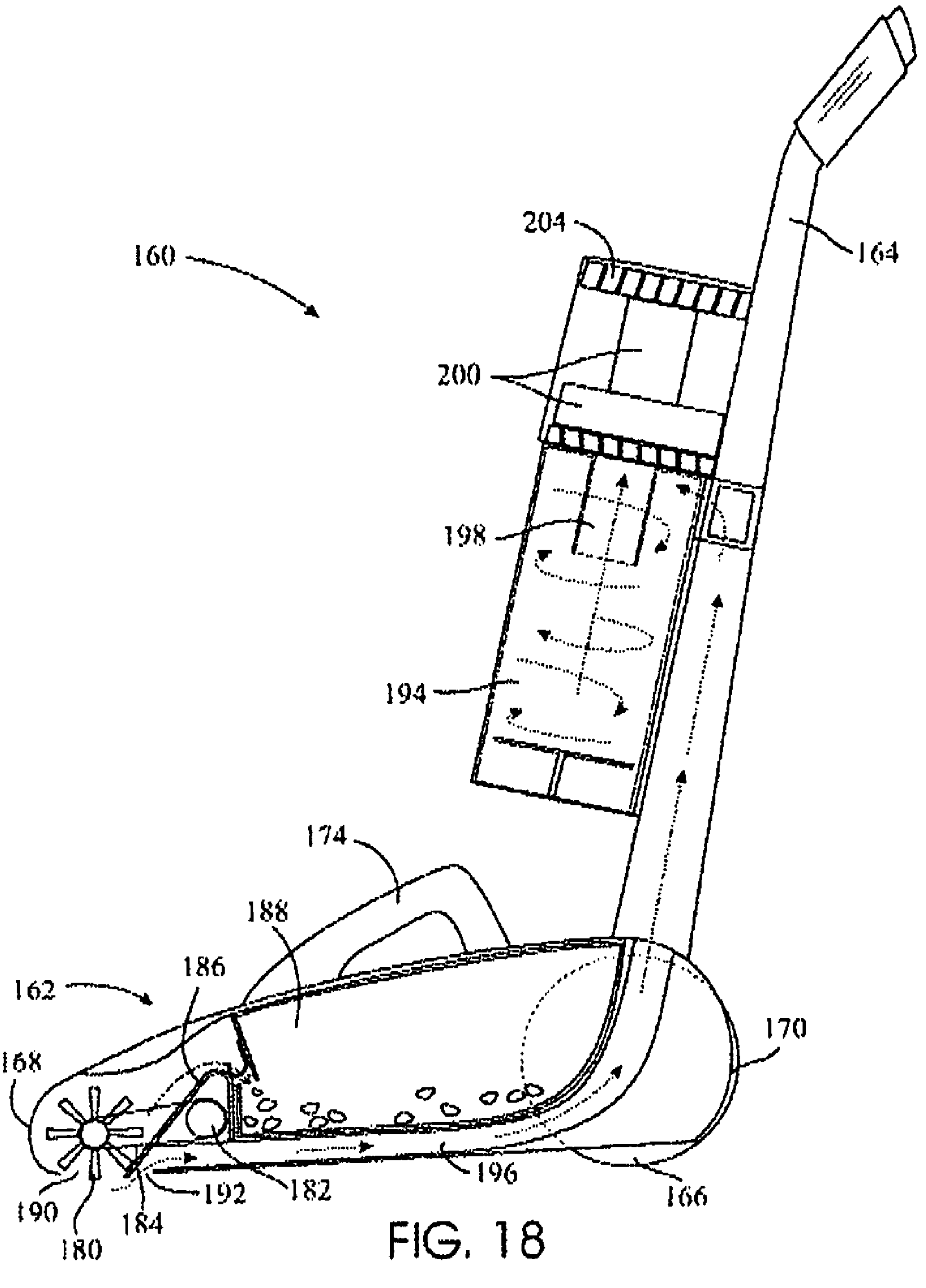
FIG. 18 is a perspective view of a further alternate surface cleaning apparatus using a dirt container according to the instant invention.

As shown in FIGS. 17A and 17B, surface cleaning head 162 may be provided with a brush 180 which is rotatably driven by brush motor 182 via drive belt 184. Brush 180 sweeps particulate matter up ramp 186 into settling chamber 188 of dirt container 178. To this end, surface cleaning head 162 may be provided with inlet 190 adjacent brush 180. In the embodiment shown in FIGS. 17A and 17B, surface cleaning head 162 is also provided with a cyclone inlet 192 which is in fluid flow communication with cyclone chamber 194 via inlet passage 196 and inlet 240. Accordingly, dirt container 178 comprises settling chamber 188 and cyclone chamber 194. Further, each of settling chamber 188 and cyclone chamber 194 is provided with a separate inlet. In this construction, cyclone chamber 194 is not in fluid flow communication with settling chamber 188. Accordingly, in operation, heavier or larger particulate matter is swept up by brush 180 and deposited in settling chamber 188. Lighter and finer particulate matter is entrained in an air stream entering inlet 192 and is separated from the dirty air via the cyclonic action in cyclone chamber 194. Optionally, it will be appreciated that some bleed air may be drawn from settling chamber 188 into cyclone chamber 194. Cyclone chamber 194 is provided with an outlet 198 which is in fluid flow communication with motor and fan blade assembly 200 via passage 202. An optional air filter 204 may be provided downstream from motor and fan blade assembly 200 so as to further filter the air prior to the air being exhausted from surface cleaning apparatus 160.

A brush strip 256, which extends along the length of inlet 190, may be positioned rearward of brush 180 and, preferably, rearward of inlet 192 so as to prevent particulate matter being conveyed by brush 180 rearward of surface cleaning head 162. Optionally, brush strip 256 may be a strip of rubber or plastic.

In an alternate embodiment, it will be appreciated that surface cleaning apparatus 160 may be a sweeper. In such a case, surface cleaning apparatus 160 would not be provided with motor and fan blade assembly 200 or the air flow passages associated therewith. Accordingly, dirt container 178 would not have a cyclone chamber 194 and may merely comprise one or more settling chambers 188.

In the alternate embodiment shown in FIG. 18, surface cleaning apparatus 160 comprises a vacuum cleaner. In this particular embodiment, the dirt container 178 in surface cleaning head 162 comprises a single settling chamber 188. Cyclone air inlet 192 is upstream from cyclone chamber 194 which is mounted on handle 164. In this particular embodiment, vacuum cleaner 160 is designed as a clean air system and, accordingly, motor and fan blade assembly 200 is positioned downstream from cyclone 194. It will be appreciated that motor and fan blade assembly 200 may be positioned upstream from cyclone chamber 198 as is known in dirty air systems. It will further be appreciated that cyclone 194 may also be an assemblable dirt container as provided herein. Accordingly, the embodiment of the vacuum cleaner shown in FIG. 18 may utilize two separate dirt containers 178.

Figure 19:
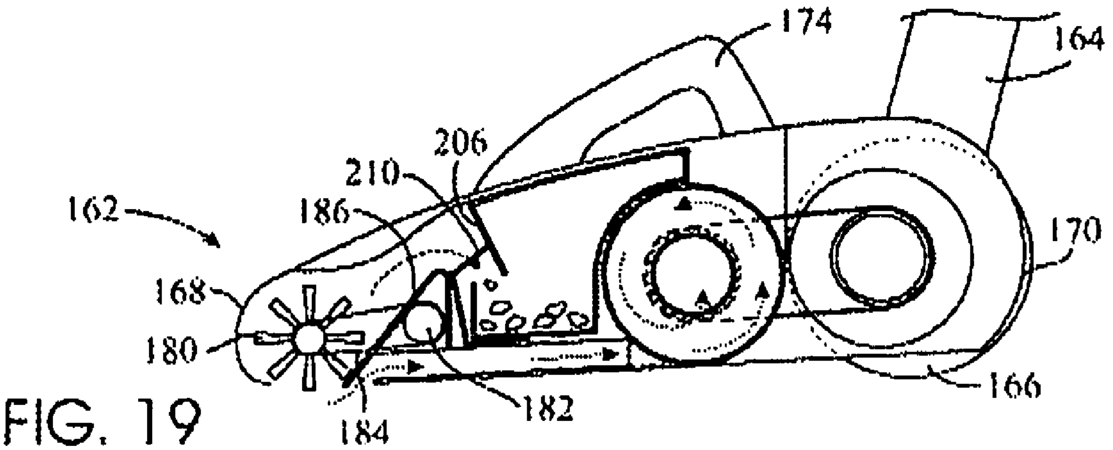
FIGS. 19, 19A and 19B show a dirt container being removed from the alternate surface cleaning apparatus of FIG. 16.
Figure 19A:
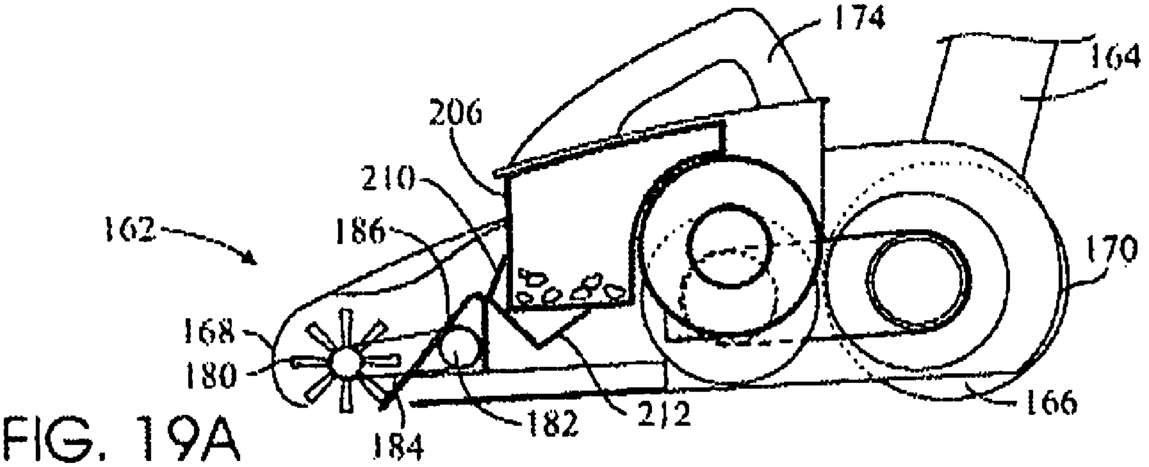

Dirt container 178 is removably mounted on or in surface cleaning apparatus 160. For example, as shown in FIGS. 19, 19A and 198, dirt container 178 may be vertically removable from surface cleaning head 162. Alternately, dirt container 178 may be inserted into surface cleaning head 162 such as by sliding dirt container 178 laterally through an opening provided in a sidewall surface cleaning head 162. Further, as shown in FIG. 18, a dirt container (a cyclone chamber 194) may be mounted on an external surface of the surface cleaning apparatus 160 (e.g. on handle 164) and need not be inserted in a recess. Preferably, dirt container 178 is removably mounted via the top of surface cleaning head 162.

Figure 22A:
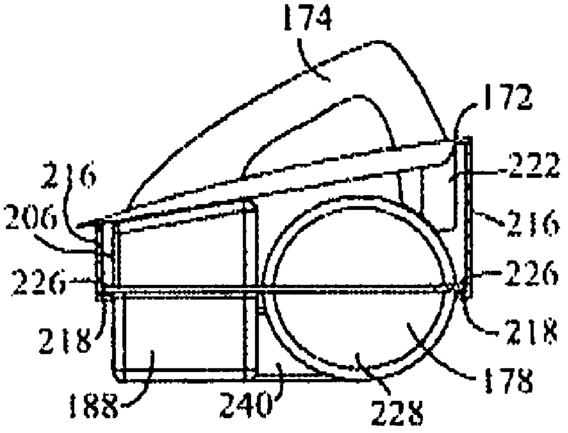
FIG. 22A is an end view of the dirt container and access panel assembly.
Figure 22:
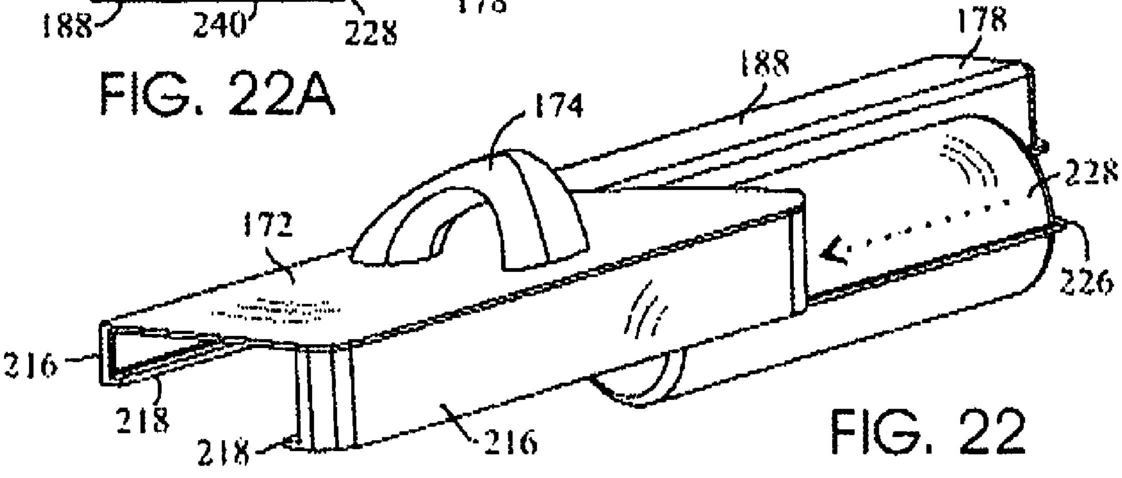
FIG. 22 is a perspective view from above of the dirt container of FIG. 20 being inserted in the access panel that is shown in FIG. 21.

In order to assist the removal of dirt container 178 from surface cleaning apparatus 160, a handle may be provided on dirt container 178. Alternately, as shown in FIG. 22, dirt container 178 may be removably received in a cover 172 which is provided with a handle 174.

When dirt container 178 is full, or has been used to collect particulate matter, some of the particulate matter collected therein may be ejected therefrom as dirt container 178 is removed from surface cleaning apparatus 160 and transported to a garbage bin. Accordingly, a closure member 206 may be provided to close one or more of the inlets and outlets of dirt container 178. Closure member 206 may be any member which is designed to close or substantially close an inlet or outlet of dirt container 178. Closure member 206 may be moved from an open position to a closed position (and vice versa) manually by a user or automatically upon being inserted or removed from surface cleaning apparatus 10 or it may be biased in one particular position. Closure member 206 may be a flap or it may comprise a thin flexible piece of plastic (e.g., like food wrap) which may be taped in place to close an inlet or outlet of dirt container 178. Due to the configuration of tangential cyclone inlet 240, inlet 240 of the cyclone may not be provided with a closure member 206 as a noticeable amount of dirt may not travel in the reverse direction through a tangential inlet. Similarly, the cyclone outlet may not require a closure member as a noticeable amount of dirt may not travel through the cyclone outlet merely by removing the dirt container 178 from the surface cleaning apparatus 160 and transporting the dirt container to a garbage bin. If it is desired to close such inlets and outlets, then any of the mechanisms provided herein may be used.

Figure 19B:
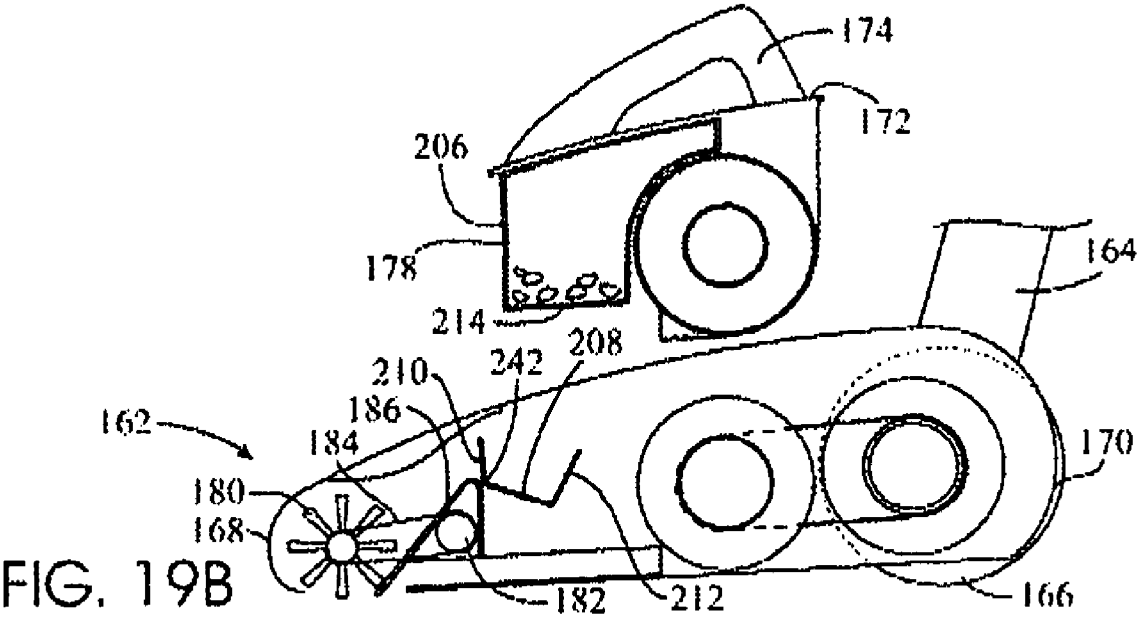

Referring to the embodiment shown in FIGS. 19, 19A and 19B closure member 206 comprises a flap which is preferably integrally molded as part of dirt container 178. Preferably, closure member 206 is biased to the closed position. This biasing can be produced by a spring or by the resiliency of the plastic or other material from which dirt container 178 is constructed. Accordingly, closure member 206 will travel towards the closed position (shown in FIG. 19B) when dirt container 178 is removed from surface cleaning head 162. In accordance with such an embodiment, surface cleaning head 162 is provided with an actuator 208 which is drivingly connectable to closure member 206 so as to move closure member 206 from the closed position to the open position (see FIG. 19) as dirt container 178 is inserted into surface cleaning head 162. Further, when dirt container 178 is removed from surface cleaning head 162, actuator 208 will permit closure member 206 to move to the closed position as dirt container 178 is removed. Actuator 208 may be automatically actuated when dirt container 178 is moved or it may be manually operable by a user. Preferably, actuator 208 is drivenly operated by the insertion of a dirt container 178 into a suitable recess.

It will be appreciated that if closure member 206 is not biased to the closed position, that actuator 208 may also be drivingly connected to closure member 206 so as to draw closure member 206 to the closed position as dirt container 178 is removed from surface cleaning head 162. It will also be appreciated that closure member 206 may be biased to the open position and that the closure member may be manually moved to the closed position by the user once the dirt container is removed from surface cleaning apparatus 160. Alternately, actuator 208 may be configured to draw closure member 206 to the closed position. In such a case, closure member 206 be provided with a latch or the like to hold closure member 206 in the closed position.

As shown in FIGS. 19, 19A and 19B, actuator 208 may be a pivotally mounted about pivot 242 and may have a first arm 210 and a second arm 212. First arm 210 is configured to engage closure member 206 (e.g. by abutting there against). Second arm 212 is adapted to be drivingly engaged by bottom panel 214 of dirt container 178. Actuator 208 is biased to the disengaged position shown in FIG. 19B. Accordingly, as dirt container 178 is pulled upwardly out of surface cleaning head 162, actuator 208 pivots to the position shown in FIG. 19B. As actuator 208 pivots counter clockwise, first arm 210 rotates upwardly and forwardly thereby permitting closure member 206 to move to the closed position. When dirt container 178 is inserted into surface cleaning head 162, bottom panel 214 engages second arm 212 causing actuator 208 to rotate clockwise. As actuator 208 rotates clockwise, first arm 210 engages closure members 206 (which is in the closed position as shown in FIG. 19A). As dirt container is inserted all the way into surface cleaning head 162 to the position shown in FIG. 19, first arm 210 continues to rotate downwardly and forwardly thereby driving closure member 206 to the open position. Preferably, as shown in FIG. 19, first arm is at a position below the top of ramp 186 and, in fact, may form an extension of ramp 186.

An alternate embodiment of actuator 208 is shown in FIGS. 17B and 20. As shown therein, actuator 208 comprises one or more U-shaped members mounted on closure member 206. U-shaped member 208 are adapted to cam along the top of ramp 186, or alternate cam surface, as dirt container 178 is inserted or removed from surface cleaning head 162. Closure member 206 is biased to the closed position. Therefore, when dirt container 178 is removed from the recess, closure member 206 will move towards the closed position as the U-shaped member 208 cams along the top of ramp 186.

Figure 25:
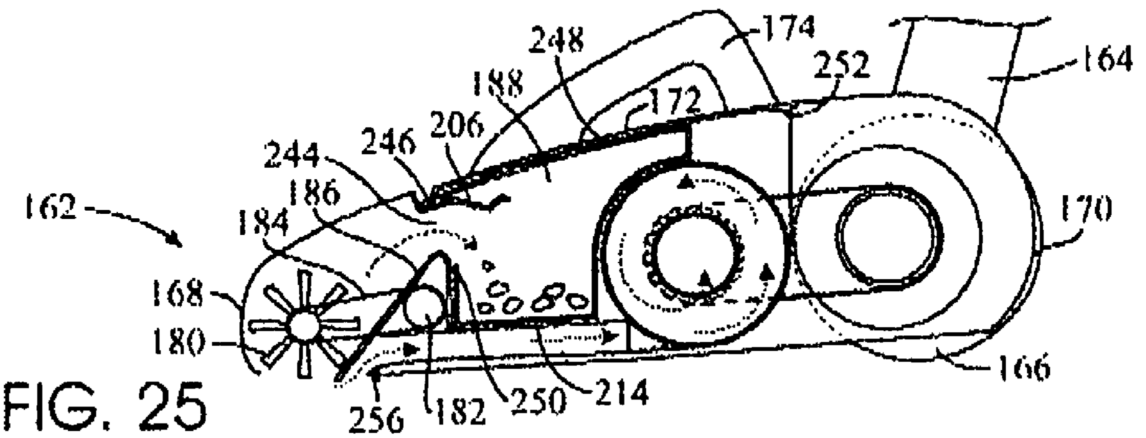
Figure 25A:
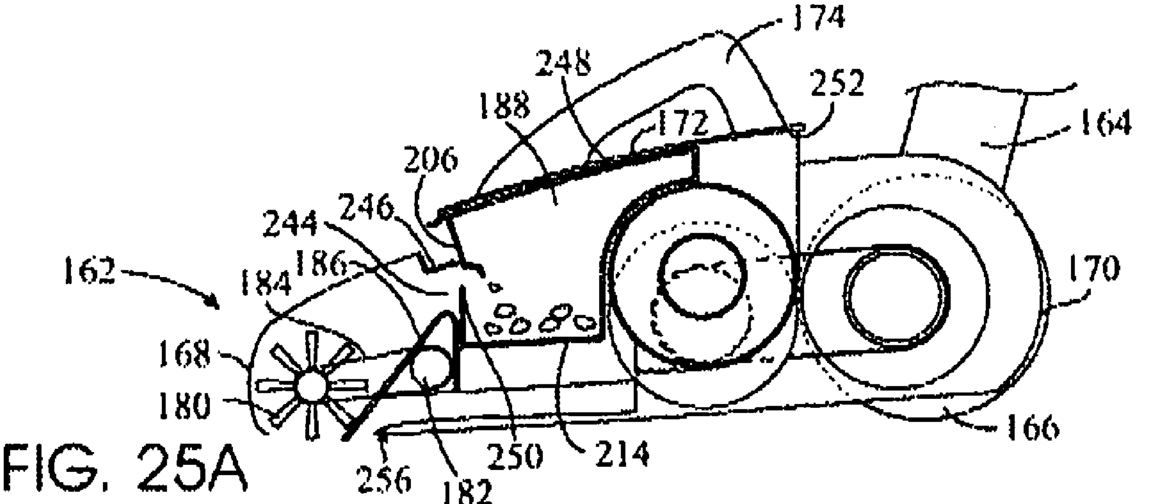
Figure 25B:
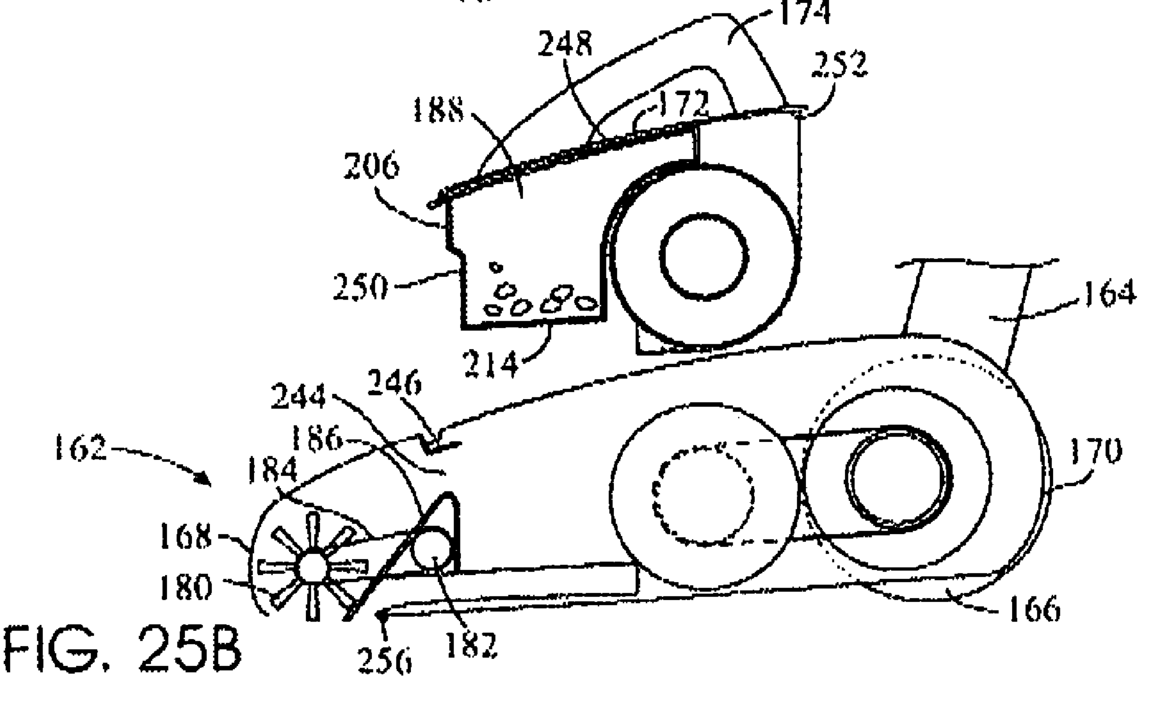

A further alternate embodiment of actuator 208 is shown in FIGS. 25A and 25B. As shown therein, dirt container 178 is provided with a closure member or flap 206. Flap 206 is sized to close inlet 244 to chamber 188. In this embodiment, flap 206 is biased to the closed position (i.e. to abut top 250 of inlet 244 thereby closing inlet 244). Flap 206 may be biased to the closed position by any means known in the art. For example, flap 206 may be a separately formed member that is attached to dirt container 178 and biased to the closed position by a spring. Preferably, as shown in FIGS. 25A and 25B, flap 206 is integrally molded with dirt container 178 and is biased to the closed position by the resiliency of the material from which dirt container 178 is formed. Surface cleaning head 162 is provided with a flange 246 that acts as an actuator 208. Flange 246 is positioned so as to engage flap 206 and push flap 206 to an open position as dirt container 178 is inserted into recess 176.

Preferably, bottom panel 214 of chamber 188 and bottom 250 of inlet 244 are narrower than top panel 248 of container 188. Accordingly, when dirt container 178 is inserted into recess 176, the bottom portion of dirt container 178 may pass into recess 176 without contacting flange 244. As the upper portion of dirt container 178 passes into recess 176, flap 206 engages flange 246 and is pushed rearwardly so as to open inlet 244. When dirt container has been inserted into recess 176, then cover 172 may be installed to close recess 176. Bottom surface 252 of cover 172 may be configured to define a gap into which the forward portion of top panel 248 and the forward portion of flap 206 may be received when cover 172 is installed. Accordingly, the portion of flap 206 that is joined to top panel 248 is not deformed to such an extent that the biasing of flap 206 due to the resiliency of the material is lost. In this embodiment, dirt container 178 may alternately be installed in cover 172 and dirt container 178 and cover 172 then be installed in the surface cleaning apparatus.

Figure 21:
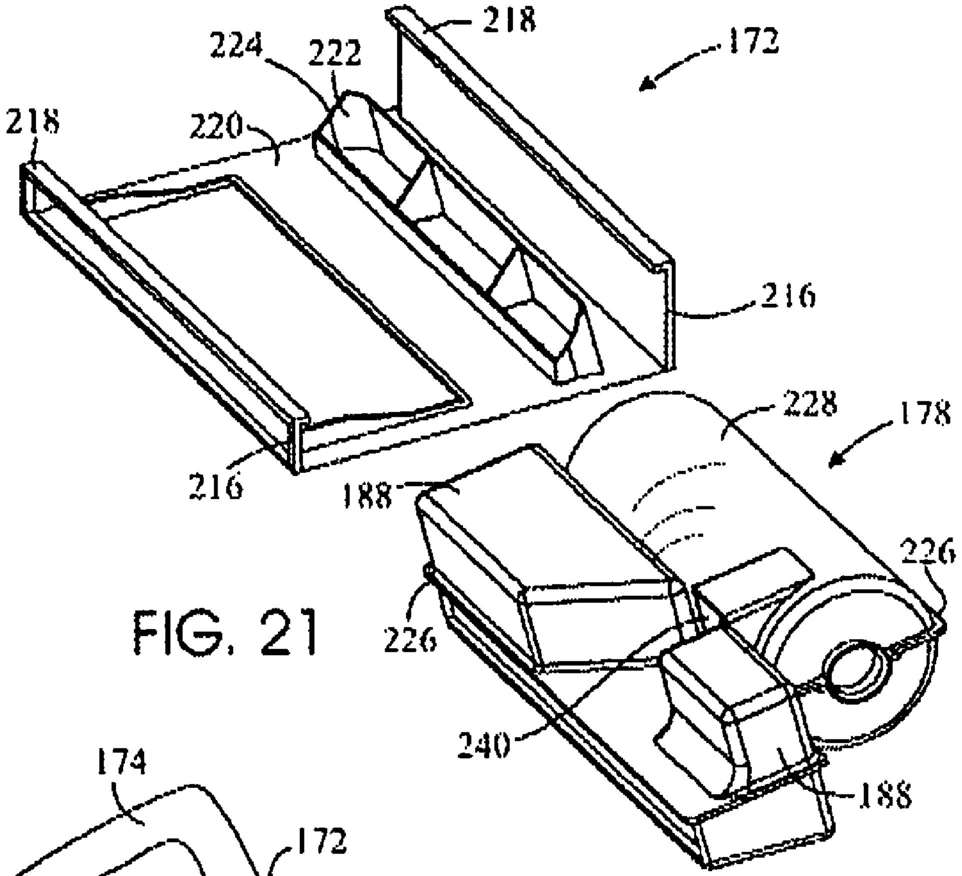
FIG. 21 is a perspective view from below of the dirt container of FIG. 20 when separated from the access panel of the recess for receiving the dirt container.

In accordance with one aspect of this invention, dirt container 178 may be removably mounted to cover 172 of recess 176 into which dirt container 178 is inserted. Cover 172 may be of any particular construction which will permit dirt container 178 to be a removably fixed thereto. Dirt container 178 may be removably affixed thereto by any mechanical or adhesive means known in the mechanical or chemical arts. As shown in FIGS. 21, 22 and 22A, cover 172 is provided with sidewalls 216 having flanges 218. Lower surface 220 of cover 172 is preferable also provided with a support member 222 having a curved engagement surface 224. Dirt container 178 is provided with forward and rearward flanges 226. Accordingly, as shown in FIG. 22, dirt container 178 may be slidably received in cover 172. As shown in FIG. 22A, cyclone housing 228 of dirt container may abut against curved engagement surface 224 of support member 222. Dirt container 178 is held in position in cover 172 by means of the engagement between flanges 218 and 226 (see FIG. 22A).

As shown in FIGS. 24A-D, dirt container 178 may be configurable between a disassembled configuaration (shown in FIG. 22A) and an assembled configuration shown in FIGS. 22C and 22D. Upper and lower portions 230 and 232 may be separately molded and comprise two individual members which are interengageable to produce a dirt container 178 in the assembled configuration in FIGS. 24C and 24D. Alternately, upper portion 230 may be pivotally mounted with respected to lower portion 234, such as by means of a hinge 234. As such, upper and lower portions 230 and 232 may be integrally molded. The thickness of the wall material in the vicinity hinge 234 is accordingly preferable sufficiently thin so as to be flexible to permit upper portion 230 to pivot with respect to lower portion 232.

Figure 23:
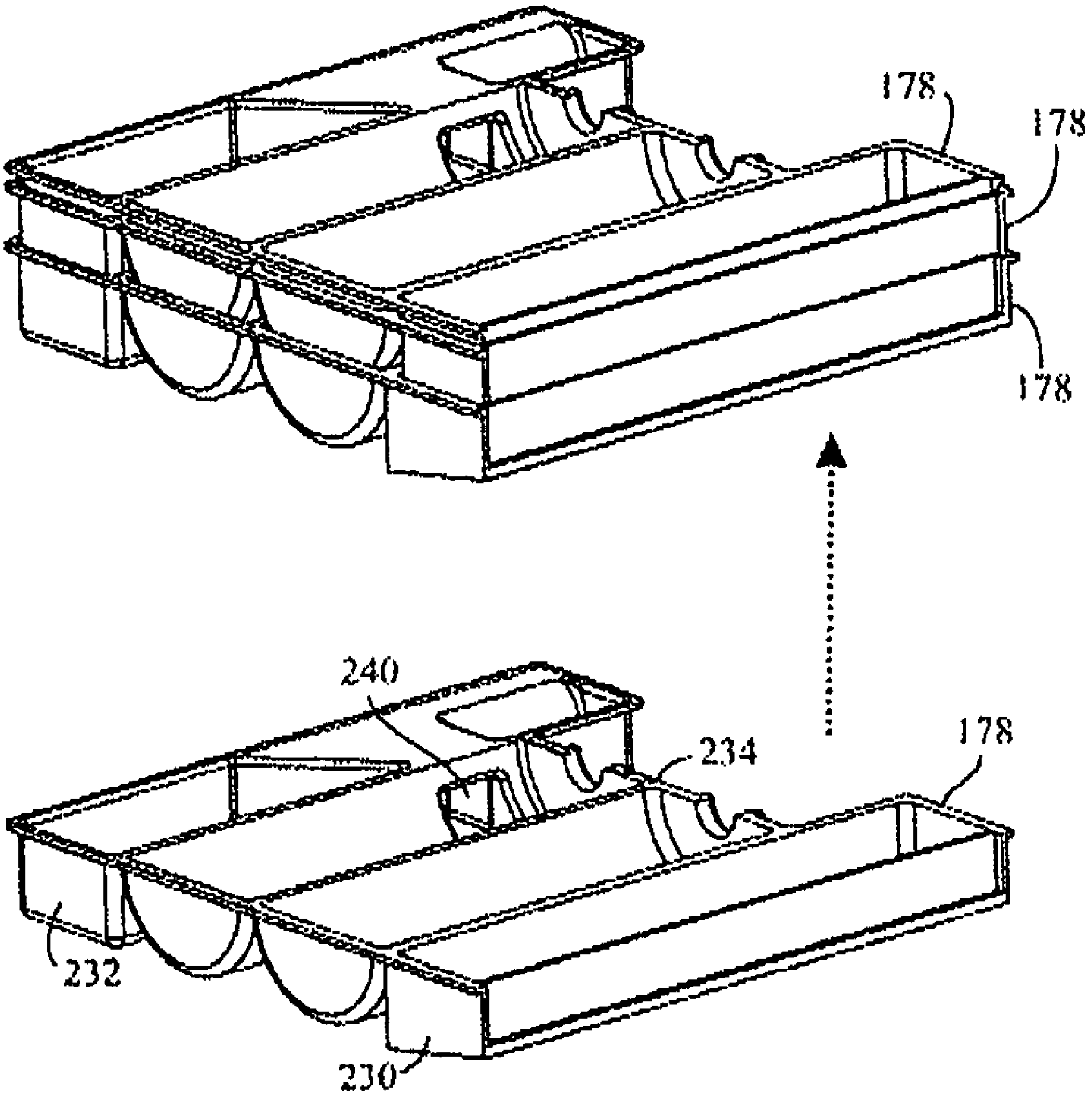
FIG. 23 is a partially exploded view of a plurality of dirt containers nested for storage with one dirt container removed from the nested position.

Upper and lower portions 230 and 232 are preferable configured so as to allow a first dirt container 178 to be at least partially nested within a second dirt container 178 as shown in FIG. 23. Accordingly, the forward, rearward and sidewalls of upper and lower portion 230 and 232 may be slightly tapered so as to permit the dirt containers 178 to be nested.

Figure 24A:
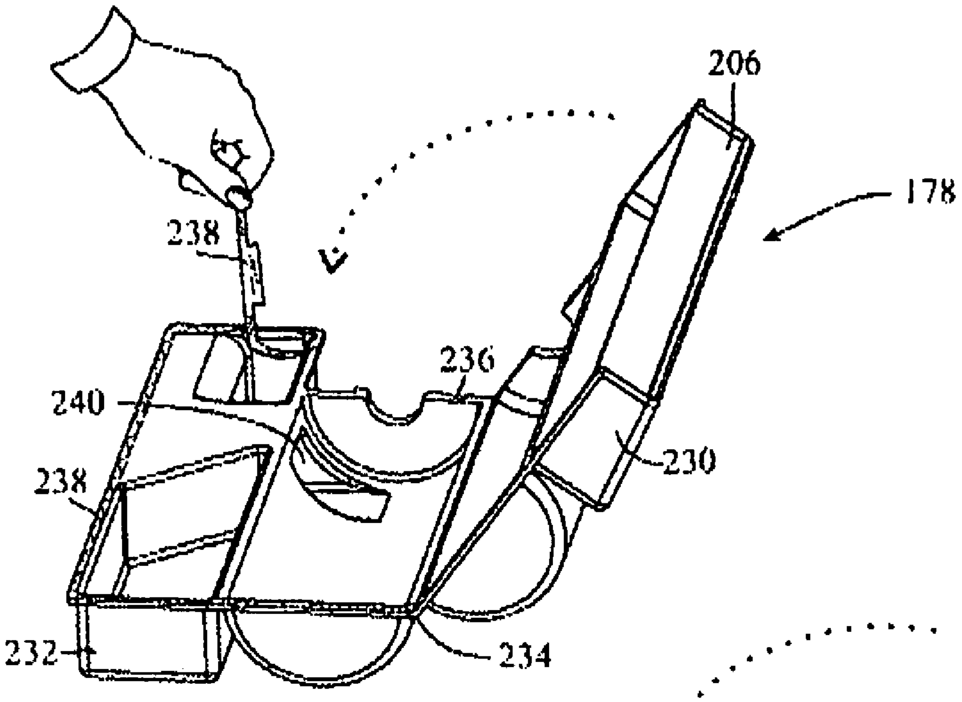
FIGS. 24A and 24B show a dirt container being prepared for assembly.
Figure 24B:
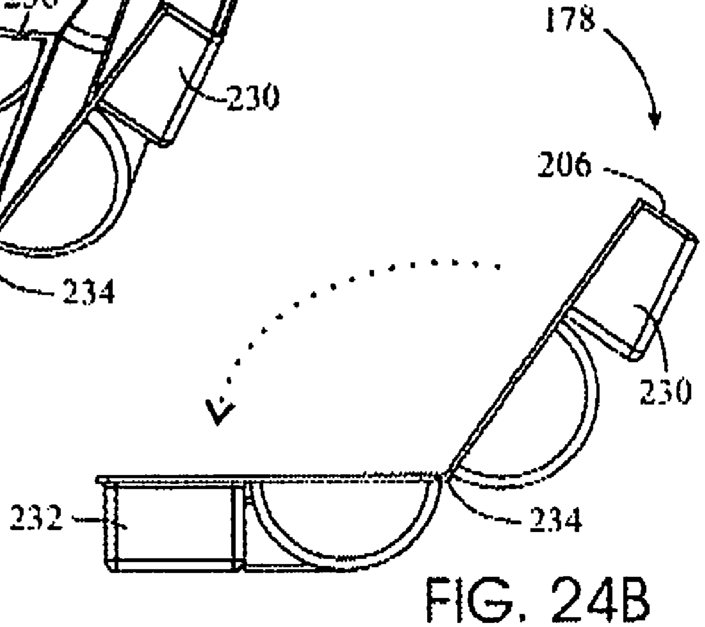
Figure 24C:
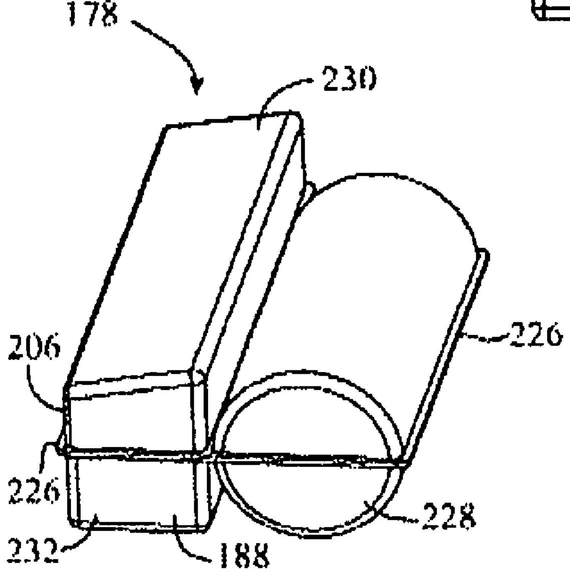
FIG. 24C is a perspective view of the dirt container of FIG. 24A in the assembled configuration.
Figure 24D:
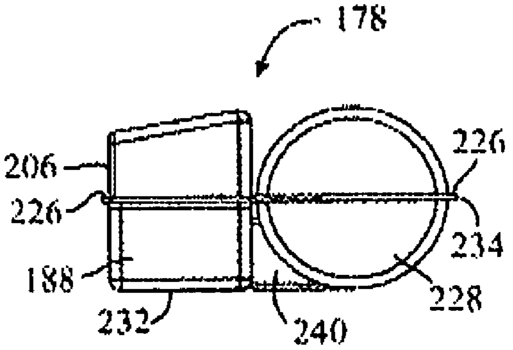
FIG. 24D is an elevation view of the dirt container of FIG. 24A in the assembled configuration; and, FIGS. 25, 25A and 25B show an alternate dirt container being installed in alternate surface cleaning apparatus of FIG. 16.

In the embodiment shown in FIGS. 24A-D, upper portion 230 is secured in position with respect to lower portion 232 by means of an adhesive 236 which is provided along the upper edge of lower portion 232 and may be provided on one or both upper and lower portions 230 and 232. As shown in FIG. 24A, a releasable cover layer 238 may be provided on top of the adhesive 236 so as to maintain adhesive 236 sufficiently clean so as to secure upper and lower portions 230 and 232 in the assembled configuration. The adhesive may be a releasable so as to permit dirt container 178 to be reconfigurable to a disassembled position (e.g., FIG. 23) such as if a consumer desires to empty the dirt container. Alternately, the adhesive may be permanent.

In use, a consumer may purchase a plurality of nested dirt containers 178 in a package in a store. When required, such as when an existing dirt container is to be replaced, one of the dirt containers 178 may be removed from the plurality of the nested containers. The container may be configured into the assembled position (e.g. as shown in FIGS. 24A-D). The assembled dirt container 178 may then be mounted in a cover 172 and inserted into a recess 178 of a surface cleaning apparatus 160. Alternately, the assembled dirt container 178 may be mounted on or in the surface cleaning apparatus 160 by any means known in the mechanical or chemical arts.

It will be appreciated by those skilled in the art that various modifications and variations of the dirt container and its method of use may be utilized and each of those is within the scope of the following claims. In particular, it will be appreciated that the shape, size, configuration, the type and number of filtration members included in the dirt container, as well as the number of dirt containers which are utilized in a single surface cleaning apparatus may be varied. In addition, while the dirt container may be transparent, it will also be appreciated that the exterior walls of the dirt container may be translucent or opaque.

The invention claimed is:

1. A surface cleaning apparatus comprising:

(a) a housing; and, (b) a disposable dirt container constructed from an air impermeable material, the dirt container being removably receivable in the housing and including at least one cyclone.

2. The surface cleaning apparatus as claimed in claim 1 further comprising an airflow path extending from a dirty air inlet to a clean air outlet and a motor and fan blade assembly, the fan blade positioned in the air flow path, the dirt container having an air inlet and an air outlet and being positioned in the air flow path.

3. The surface cleaning apparatus as claimed in claim 1 wherein the dirt container has rigid exterior walls.

4. The surface cleaning apparatus as claimed in claim 3 wherein the walls have a thickness up to 1 mm.

5. The surface cleaning apparatus as claimed in claim 1 wherein the walls have a thickness from 0.3 to 1 mm.

6. The surface cleaning apparatus as claimed in claim 1 wherein the dirt container further includes a gravity settling chamber.

7. The surface cleaning apparatus as claimed in claim 6 wherein the cyclone is downstream from the gravity-settling chamber.

8. The surface cleaning apparatus as claimed in claim 7 wherein the dirt container further includes a screen positioned upstream of the cyclone, the screen having openings therethrough sized to retain a portion of the particulate matter in the gravity settling chamber.

9. The surface cleaning apparatus as claimed in claim 1 further comprising a cleaning head having a brush, and the dirt container includes a chamber positioned to receive particulate matter swept up by the brush.

10. The surface cleaning apparatus as claimed in claim 9 wherein the cyclone is downstream from the chamber.

11. The surface cleaning apparatus as claimed in claim 10 wherein the dirt container further includes a screen positioned upstream of the cyclone, the screen having openings therethrough sized to retain a portion of the particulate matter in the chamber.

12. The surface cleaning apparatus as claimed in claim 1 wherein the dirt container has an inlet and a closure member movable between an open position in which the inlet is open and a closed position in which the inlet is closed.

13. The surface cleaning apparatus as claimed in claim 12 further including an actuator drivingly connectable to the closure member.

14. The surface cleaning apparatus as claimed in claim 13 wherein the actuator is mounted on the housing.

15. The surface cleaning apparatus as claimed in claim 14 wherein the actuator includes a cam.

16. The surface cleaning apparatus as claimed in claim 1 wherein the housing has a recess and an access panel which is moveably mounted between a closed position in which the recess is closed and an open position, and the dirt container is removably receivable in the recess.

17. The surface cleaning apparatus as claimed in claim 16 wherein the dirt container is removably mounted to the access panel.

18. The surface cleaning apparatus as claimed in claim 17 wherein the access panel is detachable from the housing.

19. The surface cleaning apparatus as claimed in claim 1 wherein the dirt container is configurable between an assembled configuration and a disassembled configuration.

20. The surface cleaning apparatus as claimed in claim 19 wherein, when the dirt container is in the disassembled configuration, the dirt container is at least partially nestable in another dirt container.

21. A surface cleaning apparatus comprising:

(a) a housing; and, (b) a disposable dirt container constructed from an air impermeable material, the dirt container being removably receivable in the housing and having an inlet and a closure member movable between an open position in which the inlet is open and a closed position in which the inlet is closed; and, (c) an actuator drivingly connectable to the closure member.

22. The surface cleaning apparatus as claimed in claim 21 further comprising an airflow path extending from a dirty air inlet to a clean air outlet and a motor and fan blade assembly, the fan blade positioned in the air flow path, the dirt container having an air outlet and being positioned in the air flow path.

23. The surface cleaning apparatus as claimed in claim 21 wherein the dirt container has rigid exterior walls.

24. The surface cleaning apparatus as claimed in claim 23 wherein the walls have a thickness up to 1 mm.

25. The surface cleaning apparatus as claimed in claim 23 wherein the walls have a thickness from 0.3 to 1 mm.

26. The surface cleaning apparatus as claimed in claim 21 wherein the dirt container includes at least one cyclone.

27. The surface cleaning apparatus as claimed in claim 21 wherein the dirt container includes a gravity settling chamber and at least one cyclone.

28. The surface cleaning apparatus as claimed in claim 27 wherein the cyclone is downstream from the gravity-settling chamber.

29. The surface cleaning apparatus as claimed in claim 28 wherein the dirt container further includes a screen positioned upstream of the cyclone, the screen having openings therethrough sized to retain a portion of the particulate matter in the gravity settling chamber.

30. The surface cleaning apparatus as claimed in claim 21 further comprising a cleaning head having a brush, and the dirt container includes a chamber positioned to receive particulate matter swept up by the brush.

31. The surface cleaning apparatus as claimed in claim 30 wherein the dirt container further includes a cyclone.

32. The surface cleaning apparatus as claimed in claim 31 wherein the cyclone is downstream from the chamber.

33. The surface cleaning apparatus as claimed in claim 32 wherein the dirt container further includes a screen positioned upstream of the cyclone, the screen having openings therethrough sized to retain a portion of the particulate matter in the chamber.

34. The surface cleaning apparatus as claimed in claim 21 wherein the actuator is mounted on the housing.

35. The surface cleaning apparatus as claimed in claim 34 wherein the actuator includes a cam.

36. The surface cleaning apparatus as claimed in claim 21 wherein the housing has a recess and an access panel which is moveably mounted between a closed position in which the recess is closed and an open position, and the dirt container is removably receivable in the recess.

37. The surface cleaning apparatus as claimed in claim 36 wherein the dirt container is removably mounted to the access panel.

38. The surface cleaning apparatus as claimed in claim 37 wherein the access panel is detachable from the housing.

39. The surface cleaning apparatus as claimed in claim 21 wherein the dirt container is configurable between an assembled configuration and a disassembled configuration.

40. The surface cleaning apparatus as claimed in claim 39 wherein, when the dirt container is in the disassembled configuration, the dirt container is at least partially nestable in another dirt container.

41. A surface cleaning apparatus comprising:

(a) a housing having a recess and an access panel which is moveably mounted between a closed position in which the recess is closed and an open position; and, (b) a disposable dirt container constructed from an air impermeable material, the dirt container being removably receivable in the recess and is removably mounted to the access panel.

42. The surface cleaning apparatus as claimed in claim 41 wherein the dirt container has rigid exterior walls.

43. The surface cleaning apparatus as claimed in claim 42 wherein the walls have a thickness up to 1 mm.

44. The surface cleaning apparatus as claimed in claim 41 wherein the dirt container includes at least one cyclone.

45. The surface cleaning apparatus as claimed in claim 41 wherein the dirt container includes a gravity settling chamber and at least one cyclone.

46. The surface cleaning apparatus as claimed in claim 45 wherein the cyclone is downstream from the gravity-settling chamber.

47. The surface cleaning apparatus as claimed in claim 46 wherein the dirt container further includes a screen positioned upstream of the cyclone, the screen having openings therethrough sized to retain a portion of the particulate matter in the gravity settling chamber.

48. The surface cleaning apparatus as claimed in claim 41 wherein the access panel is detachable from the housing.

49. The surface cleaning apparatus as claimed in claim 41 wherein the dirt container is configurable between an assembled configuration and a disassembled configuration.

50. The surface cleaning apparatus as claimed in claim 49 wherein, when the dirt container is in the disassembled configuration, the dirt container is at least partially nestable in another dirt container.

51. A surface cleaning apparatus comprising:

(a) a housing;

(b) a disposable dirt container constructed from an air impermeable material, the dirt container being removably receivable in the housing; and, (c) the dirt container is configurable between an assembled configuration and a disassembled configuration and, when the dirt container is in the disassembled configuration, the dirt container is at least partially nestable in another dirt container.

52. The surface cleaning apparatus as claimed in claim 51 wherein the dirt container has rigid exterior walls.

53. The surface cleaning apparatus as claimed in claim 52 wherein the walls have a thickness up to 1 mm.

54. The surface cleaning apparatus as claimed in claim 51 wherein the dirt container includes at least one cyclone.

55. The surface cleaning apparatus as claimed in claim 54 wherein the dirt container includes a gravity settling chamber and at least one cyclone.

56. The surface cleaning apparatus as claimed in claim 55 wherein the cyclone is downstream from the gravity-settling chamber.

57. The surface cleaning apparatus as claimed in claim 56 wherein the dirt container further includes a screen positioned upstream of the cyclone, the screen having openings therethrough sized to retain a portion of the particulate matter in the gravity settling chamber.

* * * * *